(12) United States Patent
Sakanaga et al.

(10) Patent No.: US 8,538,127 B2
(45) Date of Patent: Sep. 17, 2013

(54) IMAGE PROCESSING METHOD AND IMAGE PROCESSING SYSTEM

(75) Inventors: Toshiyuki Sakanaga, Joyo (JP); Yutaka Kato, Uji (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 322 days.

(21) Appl. No.: 13/016,517

(22) Filed: Jan. 28, 2011

(65) Prior Publication Data
US 2011/0188779 A1 Aug. 4, 2011

(30) Foreign Application Priority Data

Feb. 4, 2010 (JP) .................................. 2010-023010

(51) Int. Cl.
*G06K 9/00* (2006.01)
(52) U.S. Cl.
USPC ............. 382/141; 382/143; 382/149; 348/86; 348/125
(58) Field of Classification Search
USPC ........... 382/141, 143, 144, 145, 149; 348/86, 348/125
See application file for complete search history.

(56) References Cited

U.S. PATENT DOCUMENTS

| | | | | |
|---|---|---|---|---|
| 6,067,153 A * | 5/2000 | Mizuno | ....................... | 356/237.2 |
| 7,239,735 B2 * | 7/2007 | Nozaki | .......................... | 382/141 |
| 7,643,138 B2 * | 1/2010 | Hamamatsu et al. | ...... | 356/237.2 |
| 7,688,945 B2 * | 3/2010 | Chen et al. | ....................... | 378/62 |
| 7,796,803 B2 * | 9/2010 | Oaki | .............................. | 382/144 |
| 7,873,202 B2 * | 1/2011 | Kurihara et al. | .............. | 382/141 |
| 7,873,559 B2 * | 1/2011 | Mallozzi | ..................... | 705/36 R |
| 7,907,270 B2 * | 3/2011 | Kusunose | .................. | 356/237.4 |
| 7,957,000 B2 * | 6/2011 | Hofeldt et al. | ................ | 356/429 |
| 8,248,594 B2 * | 8/2012 | Matsui | ....................... | 356/237.2 |
| 8,263,129 B2 * | 9/2012 | DeSimone et al. | ........... | 424/489 |

FOREIGN PATENT DOCUMENTS

| | | |
|---|---|---|
| JP | 2007-170838 | 7/2007 |
| JP | 2008-152555 | 7/2008 |

OTHER PUBLICATIONS

Espacenet patent abstract for Japanese Publication No. 2008152555, Publication date Jul. 3, 2008 (1 page).
Patent Abstracts of Japan for Japanese Publication No. 2007-170838, Publication date Jul. 5, 2007 (1 page).

\* cited by examiner

*Primary Examiner* — Yosef Kassa
(74) *Attorney, Agent, or Firm* — Osha Liang LLP

(57) ABSTRACT

An image processing method and an image processing system can perform image processing with higher accuracy while a gloss is removed without immobilizing a continuously moving inspection object. The image processing apparatus images the inspection object moving in a predetermined direction plural times with an imaging unit disposed in a predetermined position while a visual field of the imaging unit is lighted by a lighting source disposed in a constant relative position with respect to the imaging unit, aligns plural images with the inspection object as a reference by searching sequentially a region indicating at least part of the inspection object between the two images in the plural images acquired by a series of imagings with the imaging unit, and produces a composite image from the aligned plural images.

12 Claims, 20 Drawing Sheets

IMGA

IMGB

IMGC

FIG. 21
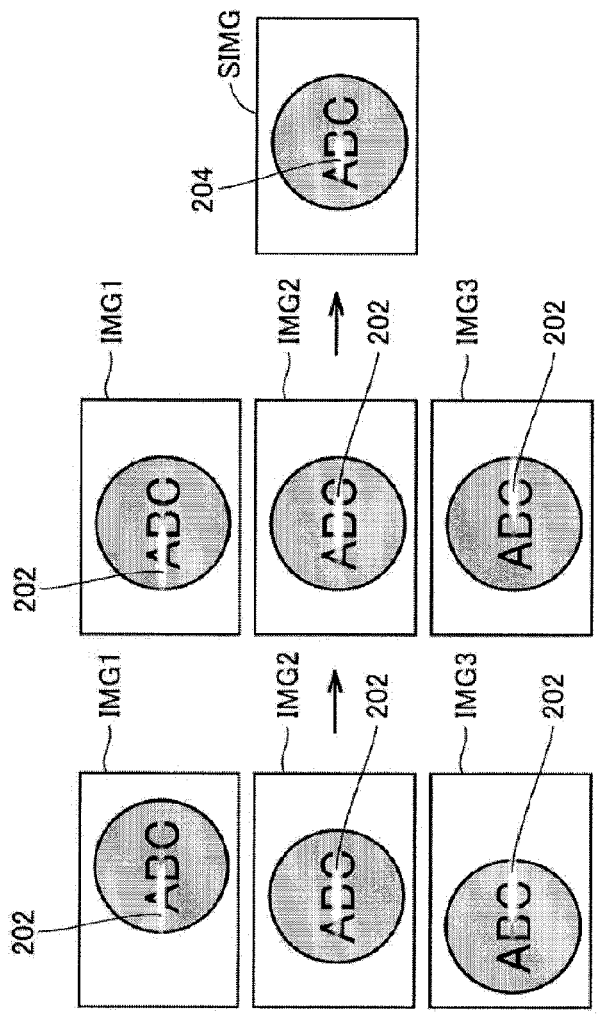
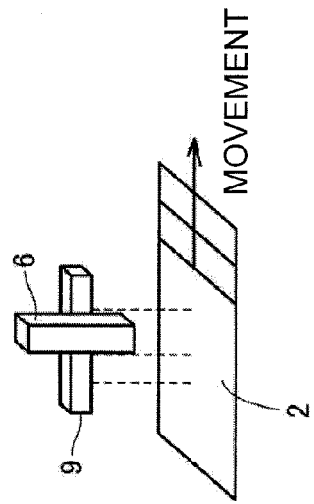
MOVEMENT

IMAGE PROCESSING METHOD AND IMAGE PROCESSING SYSTEM

TECHNICAL FIELD

The present invention relates to an image processing method and an image processing system for removing gloss that is possibly generated in imaging an inspection object.

BACKGROUND

Conventionally, various image processing technologies are used in the FA (Factory Automation) field. In a typical image processing technology, based on image data obtained by imaging an inspection object, characters printed in the inspection object are recognized, or existence of a flaw is inspected in a surface of the inspection object.

In an actual production line, sometimes a gloss is reflected on a surface of the inspection object according to a lighting environment in imaging the inspection object, a shape of the inspection object, and a positional relationship between a lighting source and an imaging unit. The gloss means a region where image information indicating the inspection object cannot significantly be acquired due to an amount of light incident to a specific region of the inspection object. Typically, the incident light amount is relatively increased with respect to the specific region of the inspection object, which causes so-called halation or a state close to the halation. In such cases, information on the character or flaw on the inspection object cannot properly be acquired due to the gloss.

Therefore, for example, Japanese Unexamined Patent Publication No. 2007-170838 discloses a configuration of an appearance inspection apparatus including a lighting source that lights an appearance inspection object and imaging means for imaging the appearance inspection object lighted by the lighting source. Image retaining means and image processing means are provided in the configuration of the appearance inspection apparatus. The image retaining means retains plural images that are obtained by imaging the appearance inspection object by the imaging means while a lighting condition of the lighting source is changed. The image processing means performs arithmetic processing to the plural images retained by the mage retaining means, thereby producing an image in which the reflection of the lighting source is removed. More specifically, using a light emitting diode that is divided into four regions in units of 90 degrees about an optical axis of a lens, the lighting condition is changed by changing a combination of the actually lighting regions in the four regions constituting the light emitting diode.

In the method disclosed in Japanese Unexamined Patent Publication No. 2007-170838, it is necessary to prepare plural lighting sources having different irradiation directions, which results in a problem in that cost is relatively increased. At the same time, it is necessary to immobilize the inspection object during the imaging, which results in a problem in that the method is hardly applied to a production line in which the inspection object is continuously conveyed. Therefore, there is a limitation to the production line to which the method disclosed in Japanese Unexamined Patent Publication No. 2007-170838 can be applied.

SUMMARY

One or more embodiments of the invention provides an image processing method and an image processing system, which can perform the image processing with higher accuracy while the gloss is removed without immobilizing the continuously moving inspection object.

In accordance with one or more embodiments of the present invention, there is provided an image processing method including the steps of: imaging an inspection object moving in a predetermined direction a plurality of times with an imaging unit disposed in a predetermined position while a visual field of the imaging unit is lighted by a lighting source disposed in a constant relative position with respect to the imaging unit; aligning a plurality of images with the inspection object as a reference by searching sequentially a region indicating at least part of the inspection object between the two images in the plurality of images acquired by a series of imagings with the imaging unit; and producing a composite image from the aligned plural image, the composite image producing step including the step of computing image information representing a unit region from pieces of image information possessed by regions in the plurality of aligned images, the computation being performed in each unit region constituting the composite image, the image information corresponding to the unit region.

In accordance with one or more embodiments of the invention, the image information computing step acquires a luminance as the image information possessed by the region of each of the plurality of aligned images and computes one of a minimum value, a maximum value, an average value, and a median as the image information representing the unit region with respect to the acquired luminance.

In accordance with one or more embodiments of the invention, the composite image producing step further includes the steps of: providing a plurality of different computation rules to compute the image information representing the unit region and producing a plurality of kinds of composite images according to the computation rules; displaying the plurality of kinds of the produced composite images; and receiving selection of the computation rule that should be used to produce the composite image in the plurality of computation rules.

In accordance with one or more embodiments of the invention, the composite image producing step further includes the steps of: providing a plurality of different computation rules to compute the image information representing the unit region and producing a plurality of kinds of composite images according to the computation rules; computing an index indicating a discrimination degree with respect to the plurality of kinds of the produced composite images; and selecting the computation rule that should be used to produce the composite image in the plurality of computation rules according to the computed index.

In accordance with one or more embodiments of the invention, the aligning step further includes the steps of: extracting a first region indicating the inspection object from a first image that is acquired by imaging the inspection object and searching a region that is matched with the first region in a second image that is acquired subsequent to the first image; and extracting a second region having a size independently of a size of the first region from the second image, the second region indicating the inspection object, and searching a region that is matched with the second region in a third image that is acquired subsequent to the second image.

In accordance with one or more embodiments of the invention, all the images including a whole or part of the inspection object in the images that are acquired with the imaging unit are aligned in the aligning step.

In accordance with one or more embodiments of the invention, a composite image having a range broader than a visual field range of the imaging unit is produced in the composite image producing step.

In accordance with one or more embodiments of the invention, the lighting source is disposed such that a longitudinal direction of the lighting source is substantially orthogonal to a moving direction of the inspection object.

In accordance with one or more embodiments of the invention, the composite image producing step further includes the steps of: displaying the plurality of images that are acquired by performing a series of imagings to a first inspection object with the imaging unit; receiving selection of the image that is used to produce the composite image in the plurality of displayed images; producing the composite image using the image corresponding to imaging timing of an image selected with respect to the first inspection object in a plurality of images that are acquired by performing a series of imagings to a second inspection object with the imaging unit.

In accordance with one or more embodiments of the present invention, there is provided an image processing system including: an imaging unit that is disposed in a predetermined position; a lighting source that is disposed in a constant relative position with respect to the imaging unit; and a control unit, wherein the control unit includes: means for causing the imaging unit to image an inspection object moving in a predetermined direction a plurality of times while a visual field of the imaging unit is lighted; means for aligning a plurality of images with the inspection object as a reference by searching sequentially a region indicating at least part of the inspection object between the two images in the plurality of images acquired by a series of imagings with the imaging unit; and means for producing a composite image by computing image information representing a unit region from pieces of image information possessed by regions in the plurality of aligned images, the computation being performed in each unit region, the image information corresponding to the unit region.

According to one or more embodiments of the invention, the image processing can be performed with higher accuracy while the gloss is removed without immobilizing the continuously moving inspection object.

BRIEF DESCRIPTION OF THE DRAWINGS

FIG. 21 is a schematic diagram illustrating the case where a longitudinal direction of a lighting source is matched with a moving direction of a workpiece.

DETAILED DESCRIPTION

Figure 1:
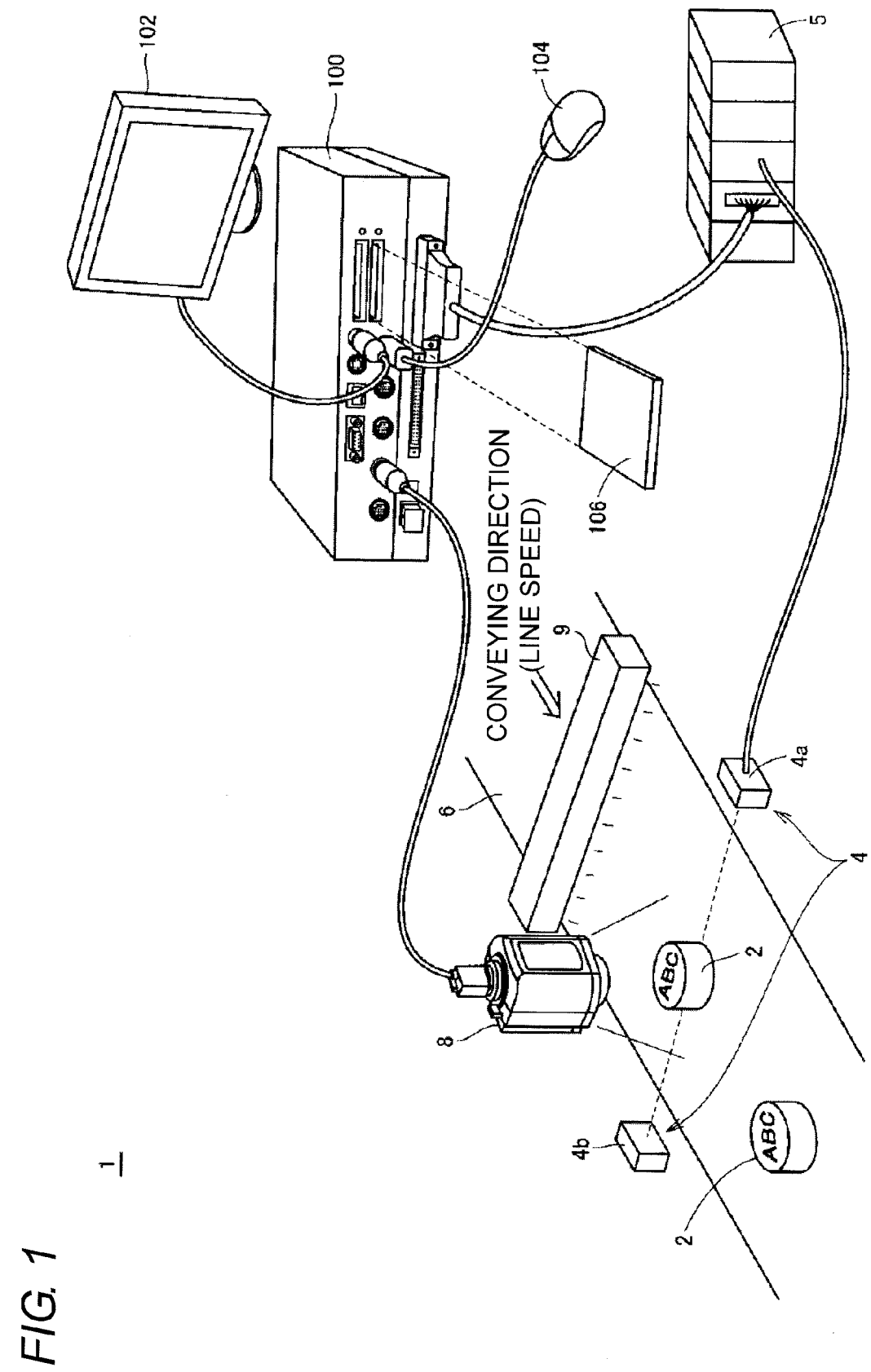
FIG. 1 is a schematic diagram illustrating an entire configuration of a visual sensor system including an image processing apparatus according to one or more embodiments of the invention.

Hereinafter, embodiments of the present invention will be described with reference to the drawings. In the drawings, the same or equivalent constituent is designated by the same numeral, and the overlapping description is omitted.

<A. Entire Configuration of Apparatus>

FIG. 1 is a schematic diagram illustrating an entire configuration of a visual sensor system 1 including an image processing apparatus 100 according to one or more embodiments of the invention.

Referring to FIG. 1, the visual sensor system 1 is an application example of an image processing system according to an embodiment of the invention, the visual sensor system 1 is incorporated in a production line to perform processing (hereinafter also referred to as "measurement processing") such as character recognition and flaw inspection based on an image that is obtained by imaging an inspection object 2 (hereinafter also referred to as "workpiece 2").

By way of example, in accordance with one or more embodiments of the invention, the workpiece 2 is conveyed in a predetermined direction by a conveying mechanism 6 such as a belt conveyer. On the other hand, an imaging unit 8 is disposed at a fixed position with respect to the workpiece 2. A lighting source 9 is disposed in a given position relative to the imaging unit 8. The lighting source 9 lights at least a visual field (range in which the workpiece 2 can be positioned) of the imaging unit 8. The imaging unit 8 images the moving workpiece 2 plural times. The plural pieces of image data obtained by the imaging unit 8 are transmitted to the image processing apparatus 100. In the lighting source 9, preferably a light amount, the number of provided lighting sources 9, and a disposition of the lighting source 9 are optimized so as not to be influenced by disturbance from a surrounding lighting environment.

As used herein, the term of "imaging" basically means processing in which the imaging unit 8 receives light from a subject in the visual field and outputs an image indicating the subject. However, when the imaging unit 8 repeatedly produces the image indicating the subject in the visual field at predetermined intervals, the "imaging" means processing in which a specific image in the images produced by the imaging unit 8 is stored in a storage unit. That is, from a certain standpoint, the "imaging" means that the imaging unit 8 acquires the image indicating subject contents in the visual field in intended timing, thereby enabling the measurement processing to be performed.

A sensor 4 disposed at both ends of the conveying mechanism 6 detects that the workpiece 2 reaches the visual field of the imaging unit 8. Specifically, the sensor 4 includes a light receiving unit 4a and a light transmitting unit 4b, which are disposed on the same optical axis, and the sensor 4 detects the arrival of the workpiece 2 by detection with the light receiving unit 4a such that the detects that the light emitted from the light transmitting unit 4b is blocked by the workpiece 2. A detection signal (hereinafter, also referred to as "trigger signal") of the sensor 4 is output to a PLC (Programmable Logic Controller) 5.

The PLC 5 wholly controls the conveying mechanism 6 while receiving the trigger signal from the sensor 4.

The visual sensor system 1 also includes the image processing apparatus 100, a display 102, and a mouse 104. The image processing apparatus 100 is connected to the PLC 5, the imaging unit 8, the display 102, and the mouse 104. The image processing apparatus 100 has (1) a setting mode in which a necessary setting value is input and determined by moving and imaging the workpiece 2 on a trial basis and (2) a normal running mode in which a series of pieces of image processing is performed.

By way of example, the imaging unit 8 includes an imaging element, such as a CCD (Coupled Charged Device) and a CMOS (Complementary Metal Oxide Semiconductor) sensor, which is partitioned into plural pixels in addition to an optical system such as a lens.

The image processing apparatus 100 is a computer having a general-purpose architecture, and the image processing apparatus 100 executes a previously-installed program to provide various functions described later When the general-purpose computer is used, an OS (Operating System) that provides a basic function of the computer may be installed in addition to an application that provides a function of the embodiment. At this point, in a program of the embodiment, processing may be performed by calling necessary program modules from program modules, provided as part of the OS, in predetermined timing in a predetermined sequence. That is, the program of the embodiment does not include the program module, but the processing is performed in conjunction with the OS. The program of the embodiment may be configured not to include some of the modules.

The program of one or more embodiments of the invention may be provided while incorporated in part of another program. Even in such cases, the program of one or more embodiments does not include the combined modules included in another program, but the program of one or more embodiments performs the processing in conjunction with the another program. That is, the program of one or more embodiments may be configured to be incorporated in another program. Part or whole of the function provided by executing the program may be implemented as a dedicated hardware circuit.

Figure 2:
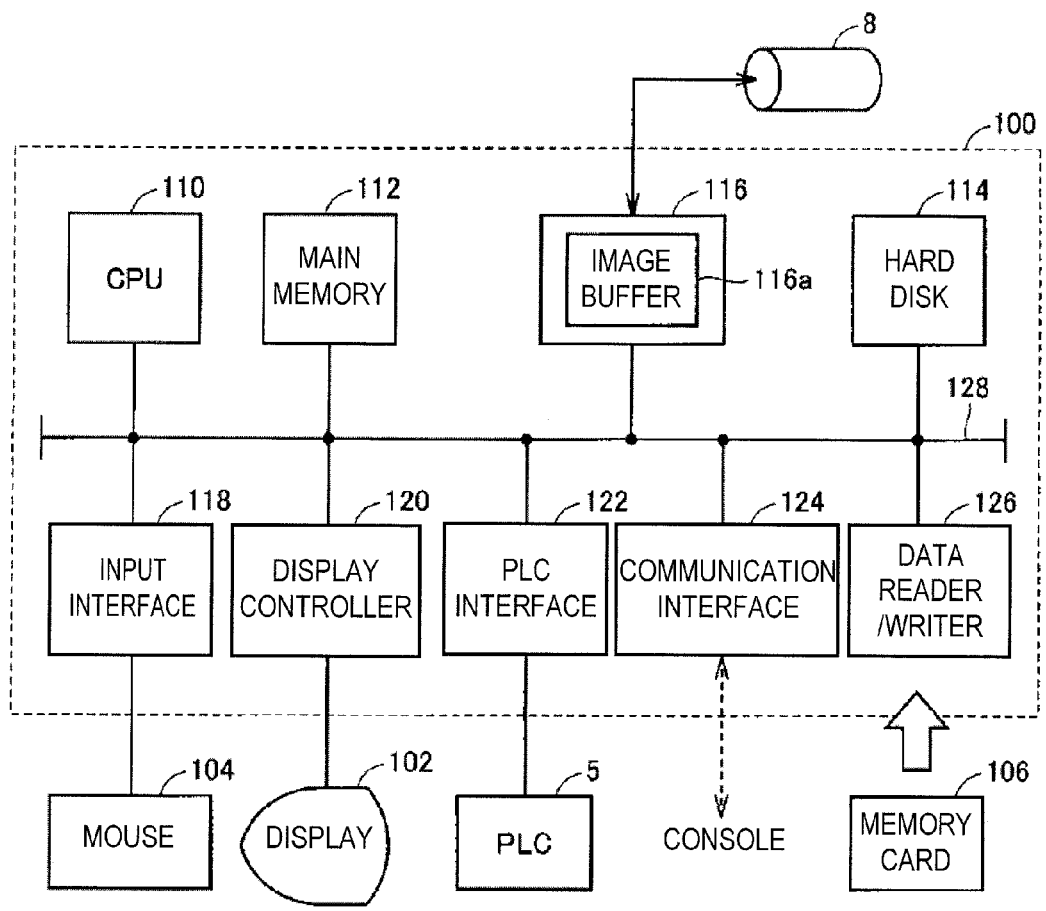
FIG. 2 is a schematic configuration diagram illustrating the image processing apparatus of one or more embodiments of the invention.

FIG. 2 is a schematic configuration diagram illustrating the image processing apparatus 100 of one or more embodiments of the invention. Referring to FIG. 2, the image processing apparatus 100 includes a CPU (Central Processing Unit) 110 that is of an arithmetic processing unit, a main memory 112 and a hard disk 114 that are of a storage unit, a camera interface 116, an input interface 118, a display controller 120, a PLC interface 122, a communication interface 124, and a data reader/writer 126. The units are connected to one another through a bus 128 such that data communication can be conducted.

The CPU 110 expands programs (code) stored in the hard disk 114 onto the main memory 112, and the CPU 110 performs various arithmetic operations by executing the programs in the predetermined order. Typically the main memory 112 is a volatile storage device such as a DRAM (Dynamic Random Access Memory), and the main memory 112 retains image data obtained by the imaging unit 8, data indicating processing result of the image data, and workpiece data in addition to the program read from the hard disk 114. The hard disk 114 is a nonvolatile magnetic storage device. In addition to the program executed by the CPU 110, image data (hereinafter also referred to as "model image") that becomes a reference in pattern search is stored in the hard disk 114. Additionally, various setting values and the like may be stored in the hard disk 114. The program installed in the hard disk 114 is distributed while stored in a memory card 106 as described later. A semiconductor storage device such as a flash memory may be used in addition to the hard disk 114 or instead of the hard disk 114.

The camera interface 116 mediates data transmission between the CPU 110 and the imaging unit 8. That is, the camera interface 116 is connected to the imaging unit 8 that images the workpiece 2 to produce the image data. More specifically, the camera interface 116 can be connected to at least one imaging unit 8, and the camera interface 116 includes an image buffer 116a in which plural pieces of image data from the imaging unit 8 is tentatively stored. When image data of at least one frame is accumulated in the image buffer 116a, the camera interface 116 transfers the accumulated data to the main memory 112. The camera interface 116 issues an imaging command to the imaging unit 8 in response to an internal command generated by the CPU 110.

The input interface 118 mediates data transmission between the CPU 110 and input units such as the mouse 104, a keyboard, and a touch panel. That is, the input interface 118 receives a manipulation command. A user manipulates the input unit to provide the manipulation command.

The display controller 120 is connected to the display 102 that is of a typical example of a display device, and the display controller 120 notifies the user of the image processing result of the CPU 110. That is, display controller 120 is connected to the display 102 to control the display of the display 102.

The PLC interface 122 mediates data transmission between the CPU 110 and the PLC 5. More specifically, the PLC interface 122 transmits information on a state of the production line controlled by the PLC 5 and information on the workpiece to the CPU 110.

The communication interface 124 mediates data transmission between the CPU 110 and a console (or personal computer or server device). Typically, the communication interface 124 includes Ethernet (registered trademark) or a USB (Universal Serial Bus). Instead of the mode in which the program stored in the memory card 106 is installed in the image processing apparatus 100, the program down-loaded from a distribution server may be installed in the image processing apparatus 100 through the communication interface 124.

The data reader/writer 126 mediates data transmission between the CPU 110 and a memory card 106 that is of a recording medium. That is, the program executed by the image processing apparatus 100 is distributed while stored in the memory card 106, and the data reader/writer 126 reads the program from the memory card 106. The data reader/writer 126 writes image data obtained by the imaging unit 8 and/or processing result of the image processing apparatus 100 in the memory card 106 in response to the internal command of the CPU 110. The memory card 106 includes a general-purpose semiconductor storage device such as CF (Compact Flash) and SD (Secure Digital), a magnetic storage medium such as Flexible Disk, or an optical storage medium such as CD-ROM (Compact Disk Read Only Memory).

Another output device such as a printer may be connected to the image processing apparatus 100 if needed.

<B. Gloss Removal Composition>

Gloss removal composition according to one or more embodiments of the invention will be described with reference to FIG. 3 and FIG. 4. FIG. 3 is a schematic diagram for explaining an example of gloss that is reflected on the image obtained by imaging a workpiece 2 in accordance with one or more embodiments of the invention. FIG. 4 is a schematic diagram for explaining an outline of the gloss removal composition processing in accordance with one or more embodiments of the invention.

Figure 3A:
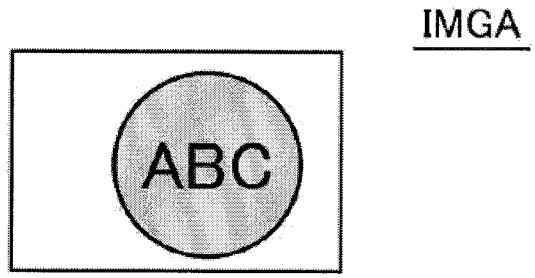
FIGS. 3A-3C are schematic diagrams for explaining an example of gloss that is reflected on an image obtained by imaging a workpiece.
Figure 3B:
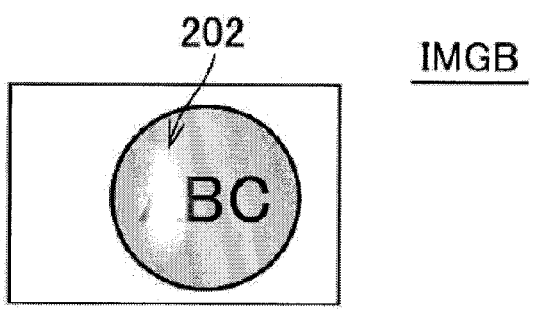
Figure 3C:
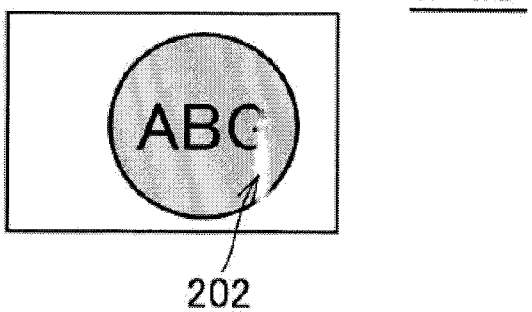
Figure 4:
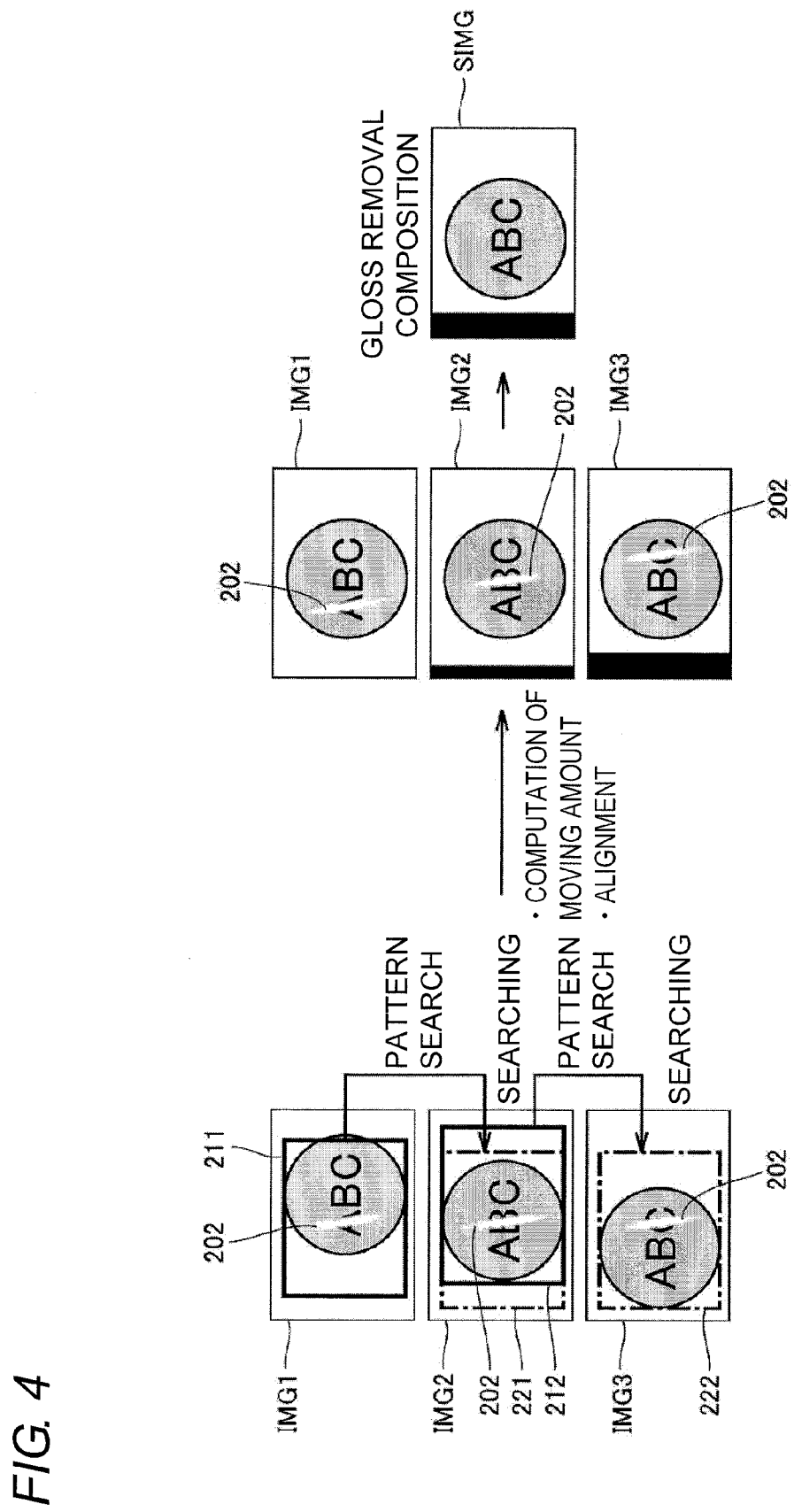
FIG. 4 is a schematic diagram for explaining an outline of gloss removal composition processing of one or more embodiments of the invention.

FIG. 3 illustrates an example of the image that is obtained by imaging the workpiece 2 from above with the imaging unit 8 (see FIG. 1). FIG. 3A illustrates an example of the image when the imaging is properly performed while the gloss is not reflected, and FIG. 3B and FIG. 3C illustrates an example in which a gloss 202 is reflected on the image.

When an image IMGA illustrated in FIG. 3A is acquired, characters (in this case, characters "ABC") of a detection target can correctly be recognized and detected.

On the other hand, the gloss 202 (white belt-like region) is reflected on the neighborhood of the character "A" in an image IMGB illustrated in FIG. 3B. Therefore, possibly a determination that the character "A" is not printed on the workpiece 2 is falsely made.

An image IMGC illustrated in FIG. 3C is obtained by imaging the workpiece 2 in which characters "ABG" different from the target characters are printed on the surface, and the gloss 202 (white belt-like region) is reflected on the neighboring of the character "G". Therefore, possibly a determination that the characters "ABC of the target characters are properly printed on the workpiece 2 is falsely made.

As illustrated in FIG. 3B and FIG. 3C, when the gloss is reflected, sometimes the originally-normal workpiece is falsely determined to be abnormal, or the originally-abnormal workpiece is determined to be normal. The image processing method (hereinafter also referred to as "gloss removal composition") of the embodiment aims to prevent the problem.

As used herein, the term of "gloss" means a region where information to be imaged on the workpiece surface cannot correctly be acquired due to the amount of light incident to the specific region of the workpiece or the surface shape of the workpiece. Typically, the light that is reflected from the workpiece and incident to the imaging unit 8 is excessively intense to become the so-called halation or the state close to the halation, thereby generating the gloss. The gloss is also generated, when light reflected from the workpiece is excessively weak to hardly read the image information of the workpiece surface.

As illustrated in FIG. 1, in the gloss removal composition of the embodiment, basically the plural images are acquired by varying the relative position of the workpiece 2 to the imaging unit 8 while an imaging condition of the imaging unit 8 and a lighting condition of the lighting source 9 are maintained. The reflected gloss is removed by composition of the acquired plural images. That is, because the workpiece 2 moves temporally with respect to the imaging unit 8, it is believed that the imagings differ from one another in the position in which the gloss is reflected on the workpiece 2. Therefore, even if image information cannot correctly be acquired in a certain image, probably the image information can correctly be acquired in another image.

By way of example, as illustrated in FIG. 4, it is assumed that images IMG1, IMG2, and IMG3 are acquired such that such that the imaging unit 8 images the workpiece 2 three times while the relative position of the workpiece 2 to the imaging unit 8 is varied. As to each of the images IMG1, IMG2, and IMG3, although the gloss 202 is reflected in the substantially same position, the gloss 202 is reflected in different positions with the workpiece 2 as a reference because the workpiece 2 moves.

Accordingly, the image information lacked by reflecting the gloss 202 can be restored by composition of the images IMG1, IMG2, and IMG3.

In order to perform the image composition, the image processing apparatus 100 sequentially performs searching (tracking) to a region indicating at least part of the workpiece 2 between consecutive two images in the imaging order with respect to the plural images acquired by the series of imagings with the imaging unit 8. The image processing apparatus 100 aligns the plural images based on the workpiece 2 as a reference. The image processing apparatus 100 performs the gloss removal composition using the aligned plural images, thereby producing a composite image SIMG.

More specifically, as illustrated in FIG. 4, the pattern search is performed based on a model image 211 illustrating the workpiece 2 while the model image 211 is extracted from the image IMG1 obtained by a first imaging, whereby a region matched with the model image 211 is searched in the image IMG2 obtained by a second imaging. Therefore, where a certain region (portion extracted as the model image) of the workpiece 2 moves between the first imaging and the second imaging can be specified.

Similarly the pattern search is performed based on a model image 212 illustrating the workpiece 2 while the model image 212 is extracted from the image IMG2 obtained by a second imaging, whereby a region matched with the model image 212 is searched in the image IMG3 obtained by a third imaging. Therefore, where the region (model image 212) illustrating the workpiece 2 moves between the second imaging and the third imaging can be specified.

When the more images are taken, the processing is repeatedly performed. Sizes of the regions extracted as the model image between two consecutive images in the imaging order may independently be determined. That is, the model image having the optimum size may be extracted in each image.

As described above, a moving amount of the workpiece 2 is computed by the pattern search, and the images IMG1, IMG2, and IMG3 are aligned with one another based on the moving amount of the workpiece 2. More specifically, the images IMG1, IMG2, and IMG3 are aligned with one another based on the workpiece 2 as a reference. That is, the alignment is achieved such that the workpiece 2 emerging on each image is located at the same position in each image.

It is not always necessary to use the consecutive two images in the plural images acquired by the series of imagings with the imaging unit 8. For example, the tracking may be performed using the images that are separated from each other by a predetermined interval (for example, odd-numbered images) in the series of images obtained by repeatedly performing the imaging at predetermined intervals.

Then, in each unit region (typically, one pixel) constituting the composite image STMG, the image processing apparatus 100 computes image information representing the unit region from the pieces of image information possessed by the regions in the aligned images IMG1, IMG2, and IMG3. The pieces of image information correspond to the unit region. More specifically, while the images IMG1, IMG2, and IMG3 are (virtually) aligned, the image processing apparatus 100 acquires luminance (in the example, the total of three pieces of luminance information are acquired) possessed by corresponding pixel in each image, and the image processing apparatus 100 computes luminance representing the pixel with respect to the acquired luminances according to a predetermined computation rule (algorithm). The computation processing is repeated as many as the number pixels included in the image, thereby producing the composite image SIMG. Examples of the algorithm include a minimum value, a maximum value, an average value, and a median.

It is not always necessary to compute the representative value in units of one pixel. The plural pixels (for example, four pixels adjacent to one another) may be dealt with as one unit region. The luminance in each unit region of the composite image may be computed using not only the luminance of the pixel included in the region of each image that corresponds completely to a certain unit region of the composite image SIMG but also the luminance of the pixel included in range adjacent to each region.

<C. Processing Procedure (Normal Running Mode)>

A processing procedure in the normal running mode of the image processing apparatus 100 in accordance with one or more embodiments of the invention will be described with reference to FIG. 5.

Figure 5:
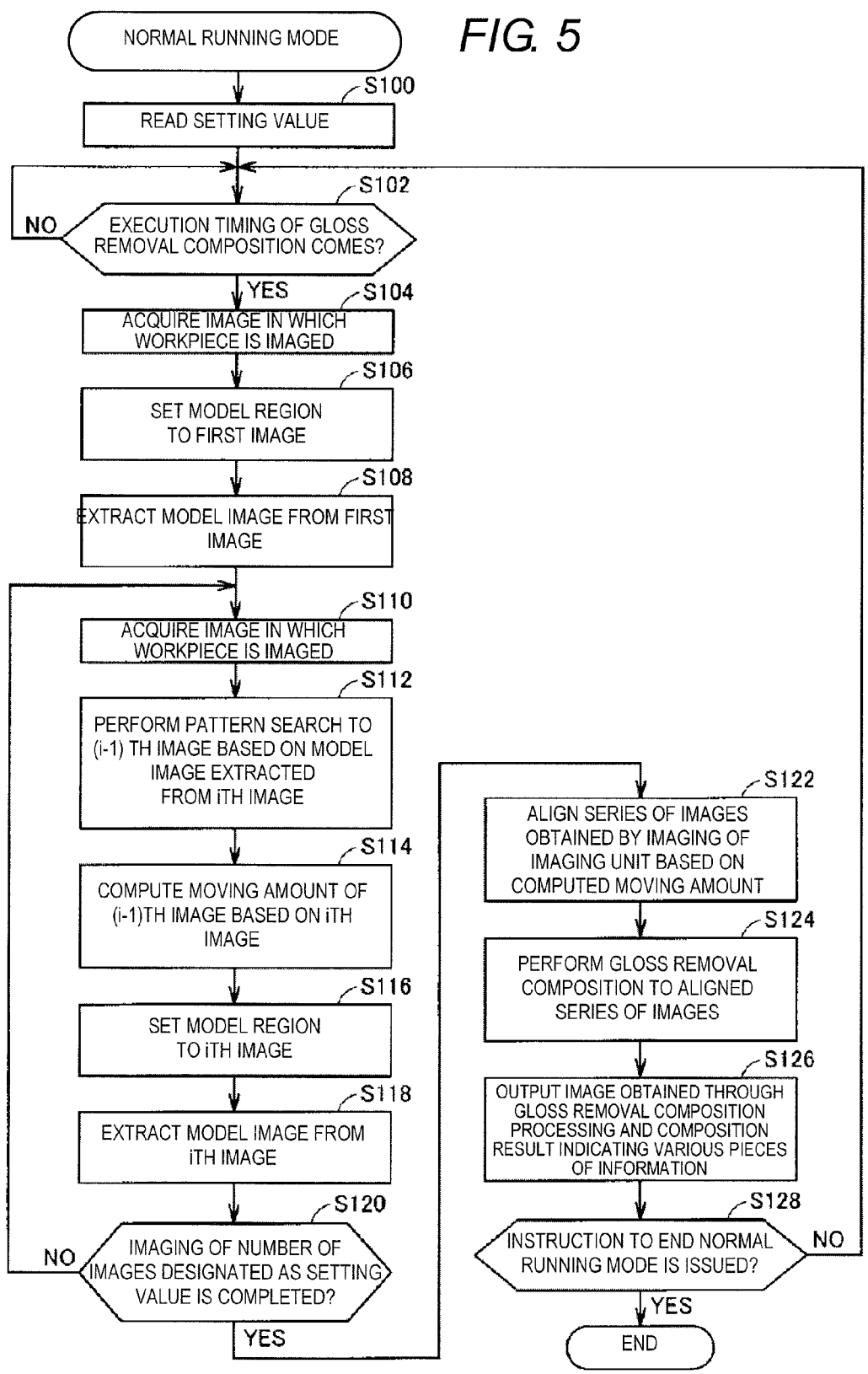
FIG. 5 is a flowchart illustrating a processing procedure in a normal running mode in the image processing apparatus of one or more embodiments of the invention.

FIG. 5 is a flowchart illustrating the processing procedure in the normal running mode in the image processing apparatus 100 in accordance with one or more embodiments of the invention. Each step illustrated in FIG. 5 is typically provided such that the CPU 110 of the image processing apparatus 100 executes the program.

Referring to FIG. 5, when the normal running mode is selected, the CPU 110 reads setting values that are set by the user in a setting mode (Step S100). In Step S102, the CPU 110 determines whether execution timing of the gloss removal composition comes. Typically, the CPU 110 determines whether the workpiece 2 reaches the visual field of the imaging unit 8 based on the signal from the sensor 4 illustrated in FIG. 1. Alternatively, the CPU 110 detects that the workpiece 2 reaches the visual field of the imaging unit 8 based on whether a background of the image acquired with the imaging unit 8 changes.

When the execution timing of the gloss removal composition comes (YES in Step S102), the flow goes to Step S104. When the execution timing of the gloss removal composition does not comes (NO in Step S102), the processing in Step S102 is repeatedly performed.

In Step S104, the CPU 110 issues the internal command to the camera interface 116 to acquire the image of the workpiece 2 imaged with the imaging unit 8. In Step S106, the CPU 110 sets the model region to the first image acquired by the first imaging of the imaging unit 8. In Step S108, the CPU 110 extracts a portion, included in the set model region in the first image, as the model image. The model region may be a previously-set fixed value, or the model region may dynamically be set according to contents of the acquired image.

In Step S110, the CPU 110 issues the internal command to the camera interface 116 to acquire the image of the workpiece 2 imaged with the imaging unit 8. In Step S112, the CPU 110 performs the pattern search to the ith image, acquired by the ith imaging of the imaging unit 8, based on the model image extracted from the (i−1)th image. In Step S114, the CPU 110 computes the moving amount of the ith image with the (i−1)th image as a reference based on the result of the pattern search.

In Step S116, the CPU 110 sets the model region to the ith image acquired by the ith imaging of the imaging unit 8. In Step S118, the CPU 110 extracts a portion, included in the set model region in the ith image, as the model image.

In Step S120, the CPU 110 determines whether the imaging is completed for the number of images designated as the setting value. When the imaging is not completed for the number of images (NO in Step S120), the CPU 110 repeatedly performs the pieces of processing from Step S110. On the other hand, when the imaging is completed for the number of images (YES in Step S120), the flow goes to Step S122. That is, the designated number of images is obtained by the imaging at the time the processing goes to Step S122.

In Step S122, the CPU 110 performs alignment among the series of images obtained by the imaging with the imaging unit 8 based on the moving amount computed in Step S114. In Step S124, the CPU 110 performs the gloss removal composition to the series of aligned images. In Step S126, the CPU 110 outputs the image obtained by the gloss removal composition and composition result indicating various pieces of information.

In Step S128, the CPU 110 determines whether an instruction to end the normal running mode is issued. When the instruction to end the normal running mode is not issued (NO in Step S128), the CPU 110 repeatedly performs the pieces of processing from Step S102. On the other hand, when the instruction to end the normal running mode is issued (YES in Step S128), the flow is ended.

<D1. Composition Setting (Part 1)>

The gloss removal composition in Step S124 illustrated in FIG. 5 will be described in detail.

Figure 6:
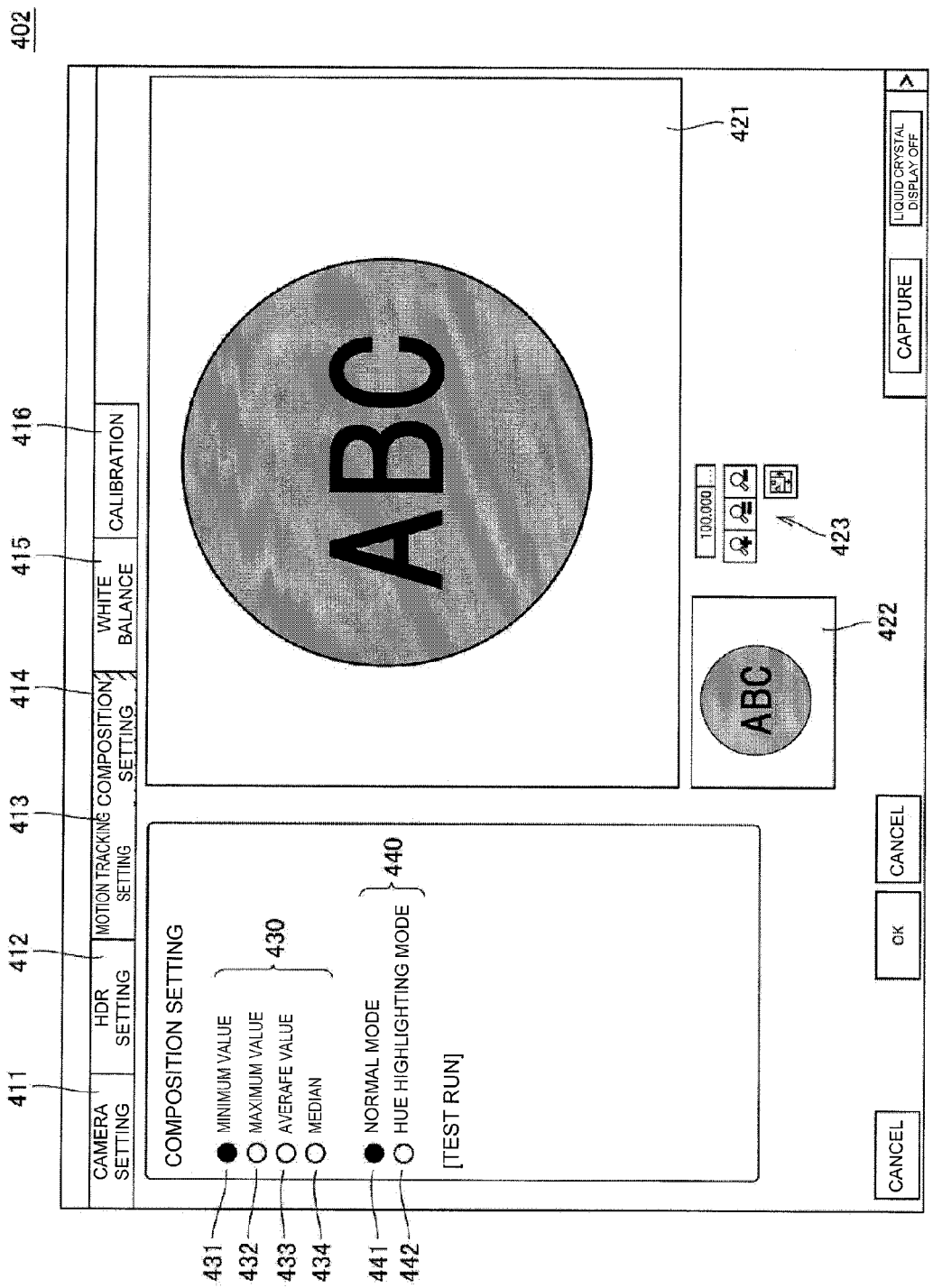
FIG. 6 is a view illustrating an example of a user interface screen used to perform composition setting of gloss removal composition of one or more embodiments of the invention.

FIG. 6 is a view illustrating an example of a user interface screen used to perform the composition setting of the gloss removal composition in accordance with one or more embodiments of the invention.

In the setting mode of the image processing apparatus 100 of one or more embodiments of the invention, settings relating to other pieces of processing can be performed in addition to the setting relating to the gloss removal composition. As illustrated in FIG. 6, the upper portion of the screen is partitioned into the total of six tabs 411 to 416, that is, "camera setting", "HDR setting", "motion tracking setting", "composition setting", "white balance", and "calibration", and a setting value relating to each tab can be input.

In the following description, it is assumed that setting values are already input to the camera setting tab 411, the white balance tab 415, and the calibration tab 416 with respect to the imaging unit 8. Because items set in the HDR setting tab 412 and motion tracking setting tab 413 have no direct relationship with the gloss removal composition, the detailed description is omitted.

FIG. 6 illustrates an example of a setting screen 402 that is displayed when the composition setting tab 414 is selected in accordance with one or more embodiments of the invention. After performing the alignment among the series of images (Step S122 illustrated in FIG. 5), the setting screen 402 receives a setting of an algorithm in order to produce a composite image used in the gloss removal composition (Step S124 illustrated in FIG. 5).

The luminance possessed by each pixel corresponding to each coordinate is acquired from the aligned plural images, and the composite image is computed based on the luminance whose value representing the coordinate is acquired. At this point, the setting screen 402 is a user interface that is used to set which luminance is used in the plural luminances or what algorithm is used.

The setting screen 402 includes a composition setting 430 and a mode setting 440 as an item of the composition setting. The composition setting 430 includes radio buttons 431 to 434 in order to select the minimum value, the maximum value, the average value, and the median. The user can arbitrarily set one of the radio buttons 431 to 434. The processing after selecting each radio button is described later.

The mode setting 440 includes a radio button 441 and a radio button 442. The radio button 441 is used to select a normal mode in which the composite image is produced based on the luminance. The radio button 442 is used to select a hue highlighting mode in which the composite image is produced based on a hue. The user can select one of the radio buttons 441 and 442.

The setting screen 402 also includes an image display area 421, an entire display area 422, and a display control icon group 423. The composite image, which is produced according to the algorithm selected by the selection of the radio buttons 431 to 434 and/or the radio buttons 440 and 441, is displayed in the image display area 421. The size of the composite image displayed in the image display area 421 can be changed according to the user's manipulation of the display control icon group 423. The entire composite image is always displayed in the entire display area 422 independently of the display size in the image display area 421.

Figure 7:
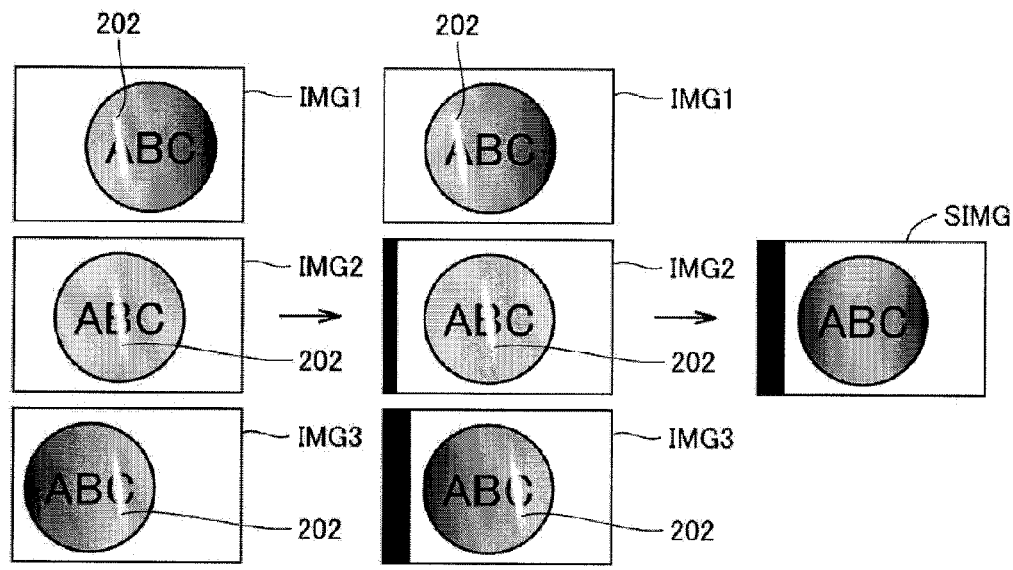
FIG. 7 is a view illustrating a processing example when a minimum value of luminance is selected in the gloss removal composition of one or more embodiments of the invention.

FIG. 7 is a view illustrating a processing example when the minimum value of the luminance is selected in the gloss removal composition in accordance with one or more embodiments of the invention.

Generally a method for selecting the minimum value of the luminances possessed by the pixels corresponding to the coordinates with respect to the series of aligned images is used as the algorithm for producing the composite image. Because the gloss (gleaming body) reflected on the image relatively has a large luminance, frequently the gloss removal composition is successfully performed by removing the relatively large luminance.

On the setting screen 402 illustrated in FIG. 6, the algorithm for selecting the minimum value among the corresponding pixels is validated by selecting the radio button 431. FIG. 7 illustrates processing example of this case. In the example illustrated in FIG. 7, it is found that the glosses reflected on the images IMG1, IMG2, and IMG3 are removed in the composite image SIMG produced by the gloss removal composition.

On the other hand, in the produced composite image SIMG, sometimes a region having the small luminance is generated by determining the minimum value of the luminance as the representative value of the coordinate. For example, in the example illustrated in FIG. 7, it is found that both end sides become dark in the composite image SIMG.

In such cases, sometimes the composite image SIMG can be produced more properly by adopting the algorithm for setting the intermediate value or average value of the luminance possessed by the pixels corresponding to the coordinates to the representative value. At the same time, possibly the pixel having the excessively-high luminance is partially generated by the influence of the luminance possessed by the gloss.

Therefore, in the image processing apparatus 100 of one or more embodiments of the invention, the plural algorithms are prepared, and the user can select the appropriate algorithm according to the imaging status (such as the lighting condition and an exposure time) or a reflectance of the workpiece of the imaging object.

Figure 8:
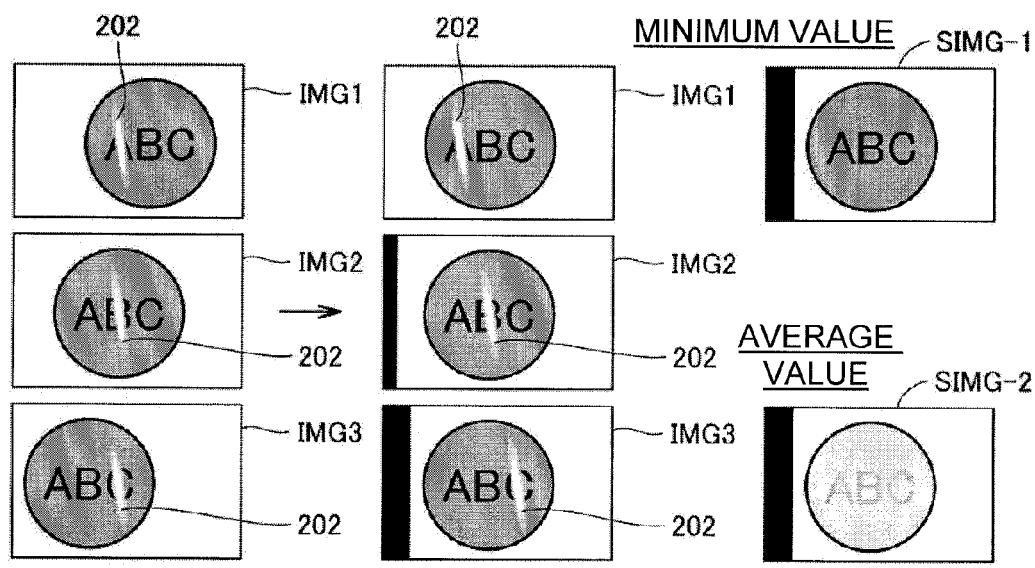
FIG. 8 is a view illustrating a processing example of the case where a composite image is obtained more properly by selecting the minimum value of the luminance in the gloss removal composition of one or more embodiments of the invention.

FIG. 8 is a view illustrating a processing example of the case where a composite image SIMG is obtained more properly by selecting the minimum value of the luminance in the gloss removal composition in accordance with one or more embodiments of the invention.

As illustrated in FIG. 8, a composite image SIMG-1 can be produced more properly by adopting the algorithm of the minimum value, when the white glosses 202 are reflected on the images IMG1, IMG2, and IMG3 (relatively large luminance (or the total of RGB values) and, at the same time, when the luminance (way of reflection) of the subject does not change even if the workpiece 2 moves with respect to the imaging unit 8.

On the other hand, when the algorithm of the minimum value is adopted in such cases, a wholly-whitish composite image SIMG-2 is produced by the influence of the gloss 202.

Figure 9:
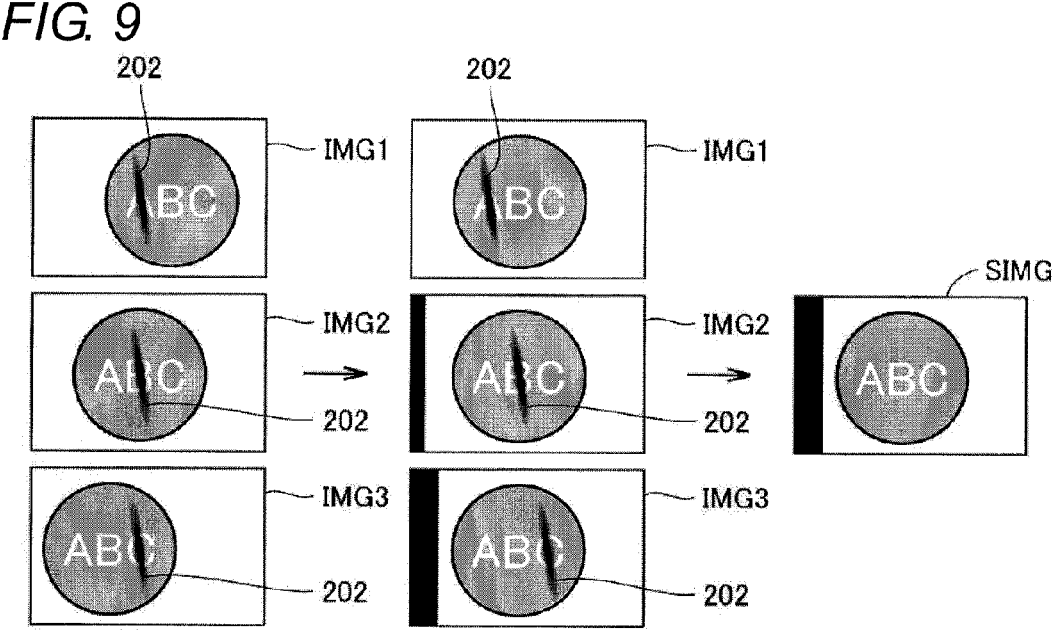
FIG. 9 is a view illustrating a processing example of the case where the composite image is obtained more properly by selecting a maximum value of the luminance in the gloss removal composition of one or more embodiments of the invention.

FIG. 9 is a view illustrating a processing example of the case where the composite image SIMG is obtained more properly by selecting the maximum value of the luminance in the gloss removal composition in accordance with one or more embodiments of the invention.

As illustrated in FIG. 9, the composite image SIMG can be produced more properly by adopting the algorithm of the maximum value, when the black glosses 202 are reflected on the images IMG1, IMG2, and IMG3 (relatively small luminance (or the total of RGB values) and, at the same time, when the luminance (way of reflection) of the subject does not change even if the workpiece 2 moves with respect to the imaging unit 8. Typically, sometimes positive/negative (monochrome) inverting processing is performed as pre-processing to the image imaged with the imaging unit 8. In such cases, the glosses 202 reflected on the images IMG1, IMG2, and IMG3 become black.

Figure 10:
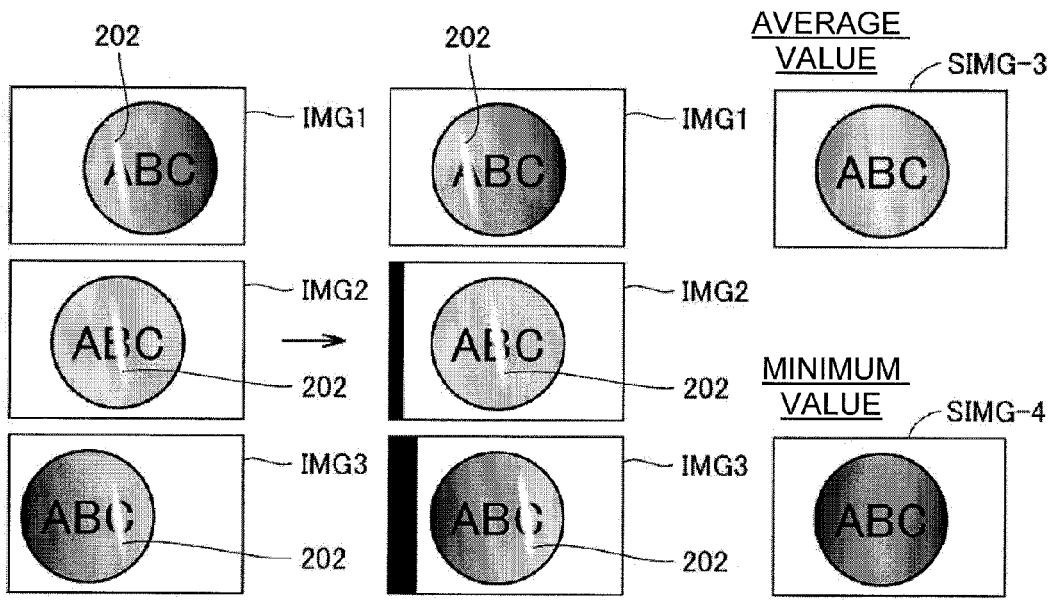
FIG. 10 is a view illustrating a processing example of the case where the composite image is obtained more properly by selecting an intermediate value/average value of the luminance in the gloss removal composition of one or more embodiments of the invention.

FIG. 10 is a view illustrating a processing example of the case where the composite image SIMG is obtained more properly by selecting the intermediate value/average value of the luminance in the gloss removal composition in accordance with one or more embodiments of the invention.

As illustrated in FIG. 10, a composite image SIMG-3 can be produced more properly by adopting the algorithm of the average value or median, when the workpiece 2 moves with respect to the imaging unit 8 to change the luminance of a portion except the glosses 202 reflected on the images IMG1, IMG2, and IMG3, On the other hand, when the algorithm of the minimum value is adopted in such cases, a wholly-blackish composite image SIMG-4 is produced by the change in luminance generated in association with the movement of the workpiece 2.

For example, an algorithm, in which the luminance exceeding a predetermined threshold is validated in the luminances possessed by the pixels corresponding to the coordinate and an average value of the valid luminances are set to the representative value, may be adopted in addition to the above-described algorithms.

<D2-1. Composition Setting (Part 2): Manual Setting>

As described above, the user can arbitrarily select the algorithm used in the gloss removal composition. For the standpoint of the user-friendliness, preferably the optimum algorithm can be determined by comparing the composite images that are produced according to the algorithms.

More specifically, the imaging unit 8 performs the imaging plural times on a trial basis while the target workpiece 2 is moved (hereinafter sometimes referred to as "test run"). At this point, preferably a designated range that becomes a target of the actual inspection processing (such as the character recognition and the flaw inspection) is set to the image imaged with the imaging unit 8.

The gloss removal composition is performed according to each of the plural algorithms based on the series of images acquired by the test run.

Figure 11:
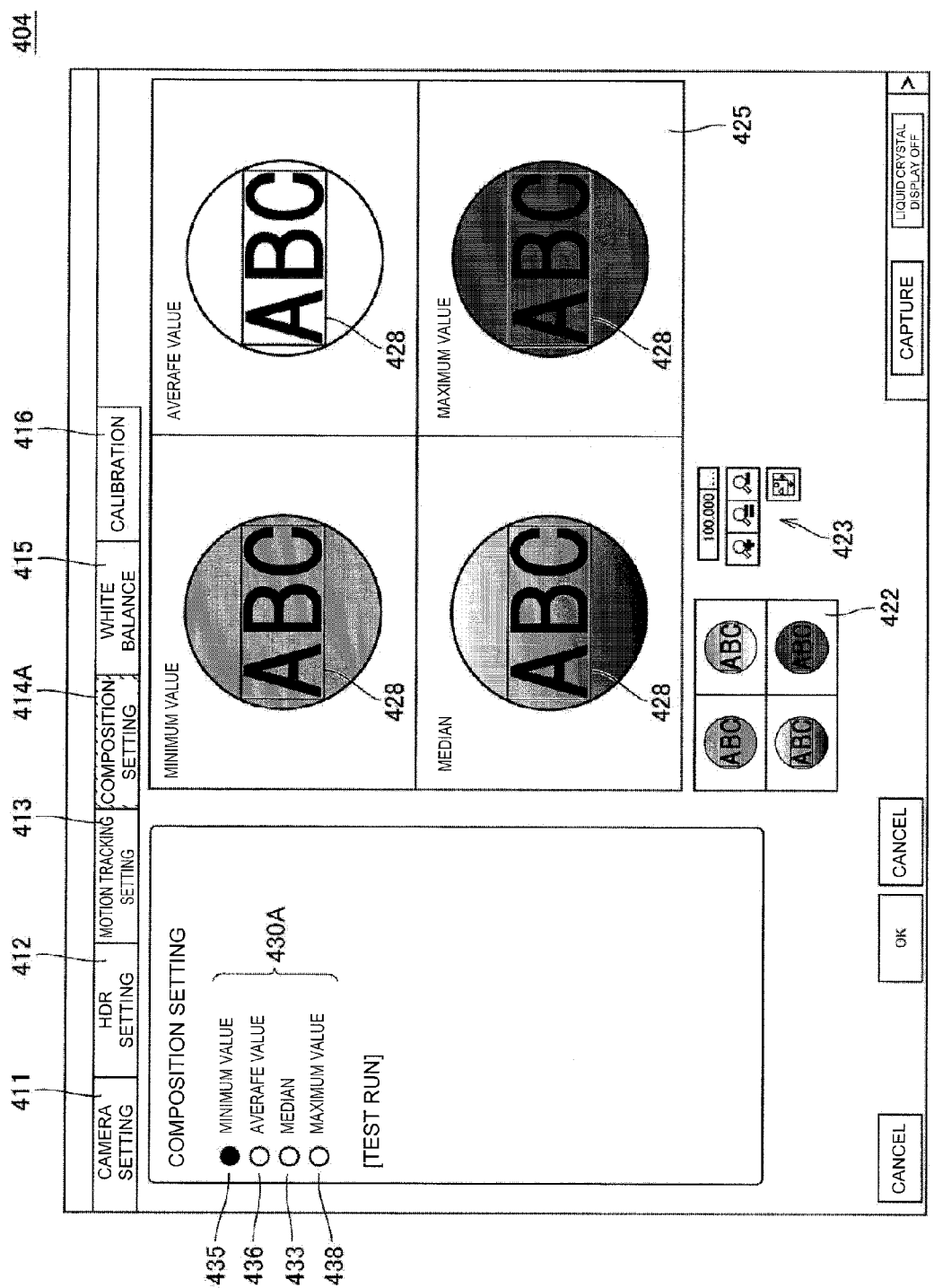
FIG. 11 is a view illustrating an example of another user interface screen used to perform the composition setting of the gloss removal composition of the gloss removal composition of one or more embodiments of the invention.

In accordance with one or more embodiments of the invention, FIG. 11 is a view illustrating an example of another user interface screen used to perform the composition setting of the gloss removal composition. In a setting screen 404 illustrated in FIG. 11, a list of the plural composite images that are obtained by performing the gloss removal composition to the series of images acquired by the test run according to the algorithms is displayed in the image display area 425 and the entire display area 422. In the example illustrated in FIG. 11, the composite images obtained according to the algorithms of the minimum value, average value, median, and maximum value are displayed. A frame indicating a position of a designated range 428 is overlay-displayed on each composite image.

In the setting screen 404, the plural composite images are displayed in the image display area 425 and the entire display area 422. The setting screen 404 includes a composition setting 430A that receives the setting which algorithm is used in the normal mode. The composition setting 430A includes radio buttons 435 to 438 that are used to select the minimum value, the maximum value, the average value, and the median. The user can arbitrarily select one of the radio buttons 435 to 438 while comparing the four composite images.

The image processing apparatus 100 varies the algorithm (computing rule) for computing the image information representing the unit region of the composite image, produces the plural kinds of the composite images according to the different algorithms, displays the plural kinds of the produced composite images, and receives the selection of the algorithm that should be used to produce the composite image in the plural algorithms.

<D2-2. Composition Setting (Part 2): Automatic Setting>

The composition setting (Part 2) may be automated. That is, an index indicating a discrimination degree is computed with respect to the plural kinds of the produced composite images, and a determination which algorithm is optimum is made according to the computed index.

Typically, the algorithm is determined such that a character color printed on the surface of the workpiece is distinguished more correctly with respect to a basic color of the workpiece. Specifically, the optimum algorithm is determined with respect to the pixel that is included in the designated range 428 set to the composite image produced according to each of the algorithms such as (a) an algorithm corresponding to the composite image in which a variance of the luminance possessed by each pixel becomes the maximum, (b) an algorithm corresponding to the composite image in which a difference between the maximum luminance and the minimum luminance becomes the maximum, and (c) an algorithm corresponding to the composite image in which a ratio of the maximum luminance and the minimum luminance becomes the maximum.

"The character color printed on the surface of the workpiece is distinguished more correctly with respect to the basic color of the workpiece" includes both the case where the user can visually distinguish the character color and the case where the character color can be distinguished in the image processing such as the character recognition and the flaw inspection processing.

That is, the image processing apparatus 100 varies the algorithm (computing rule) for computing the image information representing the unit region, produces the plural kinds of the composite images according to the different algorithms, computes the index indicating the discrimination degree with respect to the plural kinds of the produced composite images, and selects the algorithm that should be used to produce the composite image in the plural algorithms according to the computed index.

<E. Imaging Setting>

The number of images of the imaging unit 8, an imaging period, and an imaging setting including the number of images used will be described below.

The number of times (the number of images and the imaging period) in which the workpiece 2 is imaged with the imaging unit 8 in the one-time gloss removal composition and the number of images (the number of images used) actually used to produce the composite image in the plural images obtained by the imaging can be set in the image processing apparatus 100 of one or more embodiments of the invention.

As to the number of images and the imaging period, although preferably a probability of being able to remove the gloss is increased with increasing number of images, it takes a longer time to perform the one-time gloss removal composition. As to the imaging period, when the imaging period is extremely shortened, sometimes the gloss can insufficiently be removed because the gloss is reflected on the position approximated between the consecutive images. On the other hand, when the imaging period is extremely lengthened, it takes a longer time to perform the one-time gloss removal composition, and there is a restriction to the number of images that can actually be imaged because there is a restriction to a period during which the workpiece 2 exists in the visual field of the imaging unit 8.

Even in the same number of images, sometimes the gloss can be removed more securely by selecting properly the image used in the gloss removal composition.

Figure 12:
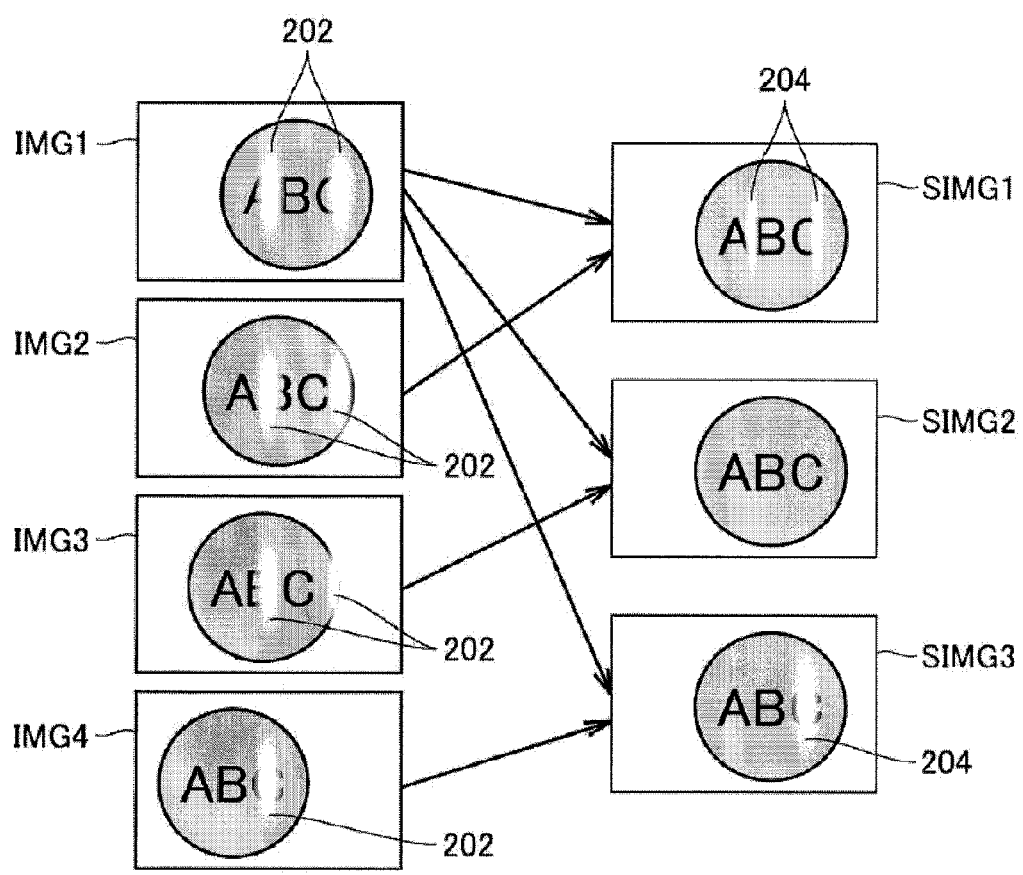
FIG. 12 is a view for explaining an influence of imaging setting of one or more embodiments of the invention.

FIG. 12 is a view for explaining an influence of imaging setting in accordance with one or more embodiments of the invention. Referring to FIG. 12, it is assumed that the images IMG1 to IMG4 are acquired by imaging repeatedly the workpiece 2 in a predetermined imaging period. It is assumed that the gloss 202 is reflected on each of the images 1MG1 to IMG4.

For example, it is assumed that the composite image SIMG1 is produced using the image IMG1 and image IMG2 according to the gloss removal composition. At this point, because the position in which the gloss 202 is reflected on the image IMG1 and the position in which the gloss 202 is reflected on the image IMG2 are close to each other, the region where the gloss 202 is reflected on both the images exists in the image information on the workpiece 2 to be reproduced. As a result, a gloss 204 that cannot be removed emerges in the composite image SIMG1.

In another example, it is assumed that the composite image SIMG3 is produced using the image IMG1 and image IMG4 according to the gloss removal composition. At this point, the position in which the gloss 202 is reflected on the image IMG1 and the position in which the gloss 202 is reflected on the image IMG4 are close to each other because of periodicity of the position in which the gloss 202 is generated. As a result, similarly to the composite image SIMG1, the region where the gloss 202 is reflected on both the images exists in the image information on the workpiece 2 to be reproduced. Accordingly, the gloss 204 that cannot be removed emerges in the composite image SIMG3.

It is assumed that the composite image SIMG2 is produced using the image IMG1 and image IMG3. At this point, because the position in which the gloss 202 is reflected on the image IMG1 and the position in which the gloss 202 is reflected on the image IMG3 are away from each other, the image information on the workpiece 2 to be reproduced is included in at least one of the image IMG1 and image IMG3. As a result, the composite image SIMG2 in which the gloss 202 is removed is produced.

The image processing apparatus 100 of one or more embodiments provides a user interface in which the user can easily perform the imaging setting.

[e1. Setting Screen (Part 1)]

Figure 13:
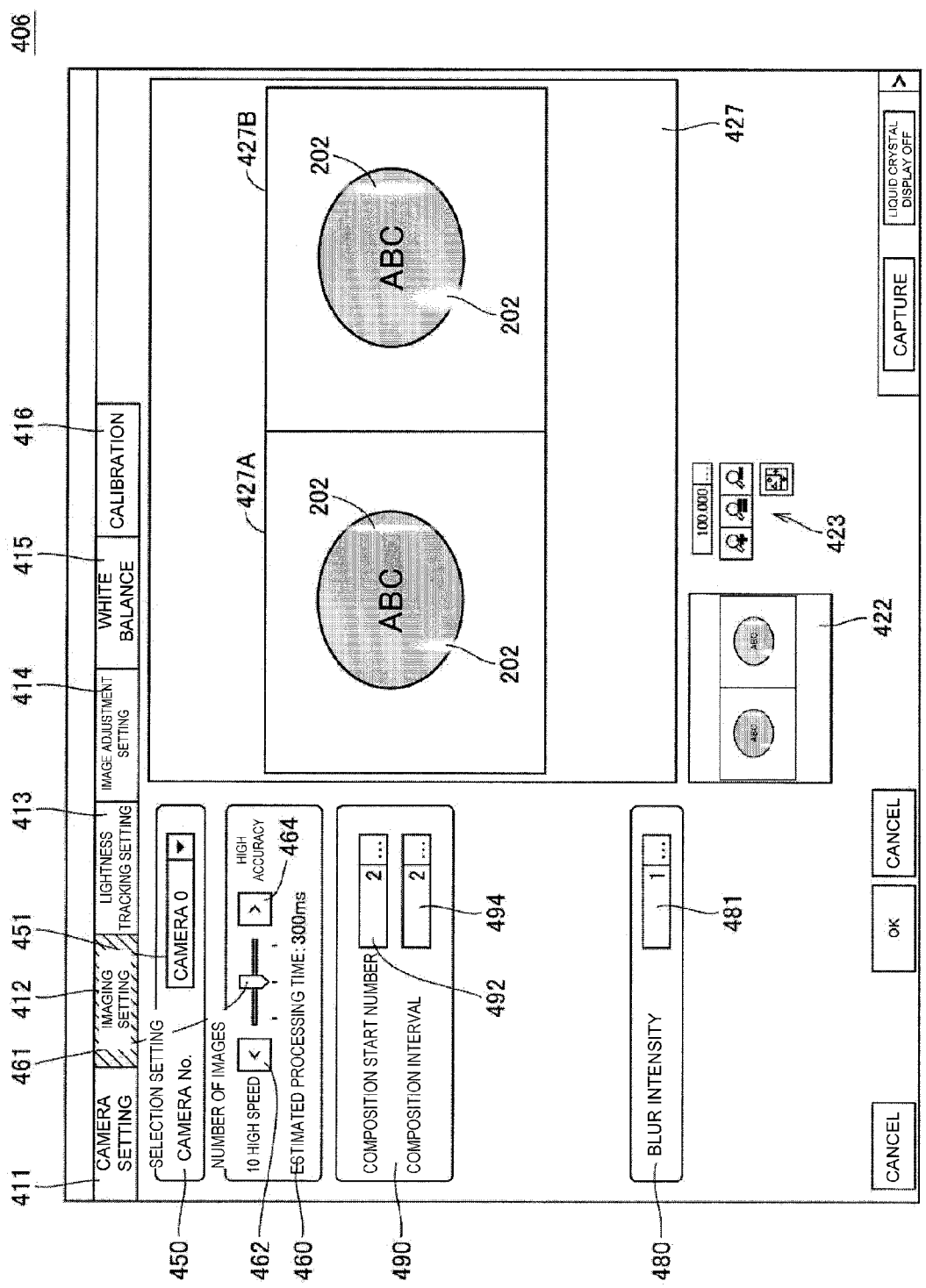
FIG. 13 is a view illustrating an example of a setting screen that is displayed when an imaging setting tab is selected.

FIG. 13 is a view illustrating an example of a setting screen 406 that is displayed in selecting an imaging setting tab 412 in accordance with one or more embodiments of the invention. The setting screen 406 receives the setting relating to the imaging of the workpiece with the imaging unit 8. More specifically, the setting screen 406 includes a selection setting 450, a setting of the number of images 460, a composition setting 490, and a blur intensity setting 480 as items of the imaging setting.

The selection setting 450 receives which input source is validated when the plural image input sources exist such that the plural imaging units 8 are connected to the image processing apparatus 100. That is, the selection setting 450 includes a camera selection dialog 451, and the user selects the target imaging unit 8 from a displayed pull-down menu (a list of the selectable imaging units 8 is displayed).

The setting of the number of images 460 receives the number of images with respect to one workpiece 2. More specifically, the setting of the number of images 460 includes a slide bar 461 and change buttons 462 and 464. The user can change the number of images and/or the imaging period (that is, the smaller number of images and/or longer imaging period) such that the imaging processing can be performed at higher speed by manipulating the slide bar 461 or the change button 462. Alternatively, the user can change the number of images and/or the imaging period (that is, the larger number of images and/or shorter imaging period) such that the generating composite image can be performed with higher accuracy by manipulating the slide bar 461 or the change button 464.

The number of imaging times (the number of images, 10 images in the example illustrated in FIG. 13) for one workpiece 2 and an estimated processing time ("300 ms" in the example illustrated in FIG. 13) necessary for one-time gloss removal composition are displayed in the setting of the number of images 460.

The composition setting 490 receives the selection of the image used in the gloss removal composition in the plural images that are obtained by imaging one workpiece 2 plural times. Specifically, the composition setting 490 includes a composition start number dialog 492 and a composition interval dialog 494. The composition start number dialog 492 receives the setting (number) to determine which image is used as an initial image in the gloss removal composition when the images that are obtained by imaging continuously one workpiece 2 are sequentially numbered. The composition interval dialog 494 receives the setting of an interval between the images used in the gloss removal composition in the series of images. In the example illustrated in FIG. 13, the composition start number is set to "2" and the composition interval is set to "2". Therefore, the total of five images "second image", "fourth image", "sixth image", "eighth image", and "tenth image" is used in the gloss removal composition.

The blur intensity setting 480 receives the setting to absorb an error (blur) by the pattern search between the images. The blur intensity setting 480 includes a blur intensity value dialog 481 to which a parameter that absorbs the error is input. A value indicating a degree of expansion of the range where the representative value of each coordinate is computed in producing the composite image can be cited as an example of the parameter set to the blur intensity value dialog 481. For example, in computing the luminance of each coordinate included in the composite image, the luminance in the corresponding coordinate with respect to each image and the luminance possessed by the pixel included in the neighborhood within the parameter (the number of pixels) set to the blur intensity value dialog 481 from each coordinate are extracted, and the representative value can be determined based on the extracted luminance.

The setting screen 406 includes the image display area 427. A composite image 427B that is obtained by performing error correction based on the blur intensity set in the blur intensity setting 480 and a composite image 427A in which the error correction is not performed are displayed side by side in the image display area 427. Therefore, the user can properly set magnitude of the blur intensity while visually recognizing the degree of error correction according to the setting in the blur intensity setting 480.

[e2. Setting Screen (Part 2)]

The user interface, in which the setting value can be changed on the "high-speed processing" side and the "high-accuracy processing" side by manipulating the slide bar 461, is described in the setting screen 406 illustrated in FIG. 13 by way of example. Alternatively, the number of images and the imaging period may be individually set.

Figure 14:
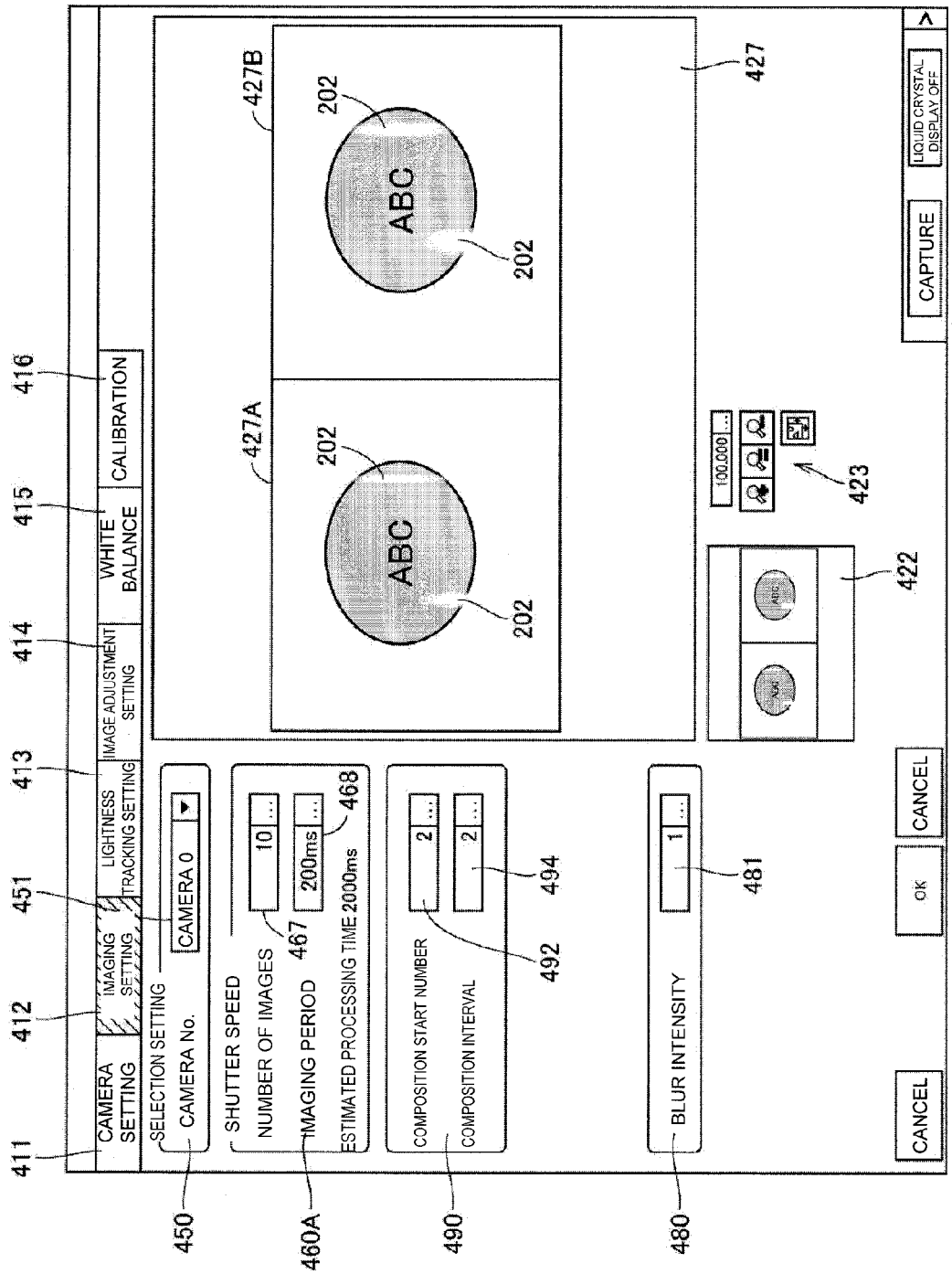
FIG. 14 is a view illustrating another example of the setting screen that is displayed when the imaging setting tab is selected.

FIG. 14 illustrates another example of the setting screen that is displayed when the imaging setting tab 412 is selected in accordance with one or more embodiments of the invention. Referring to FIG. 14, in a setting screen 407, a setting of the number of images 460A is used instead of the setting of the number of images 460 in the setting screen 406 illustrated in FIG. 13. Because other configurations are similar to those of FIG. 13, the overlapping description is omitted.

The setting of the number of images 460A receives the setting of the number of images and the imaging period with respect to one workpiece 2. More specifically, the setting of the number of images 460A includes a dialog of the number of images 467 and an imaging period dialog 468. The dialog of the number of images 467 receives the number of images that is of the number of imaging times performed to one workpiece 2 with the imaging unit 8. The imaging period dialog 468 receives the imaging period that is of the time interval until the imaging unit 8 starts the next imaging since the imaging unit 8 completes an imaging for one workpiece 2.

In order to image the workpiece 2, the user can perform the imaging setting with a higher degree of freedom using such user interface.

[e3. Setting Screen (Part 3)]

The user interface, in which the image used in the gloss removal composition can be selected by setting "the composition start number" and the "composition interval" in the composition setting 490, is described in the setting screen 406 illustrated in FIG. 13 by way of example. Alternatively, the user may perform the selection while seeing the actual image used in the gloss removal composition.

Figure 15:
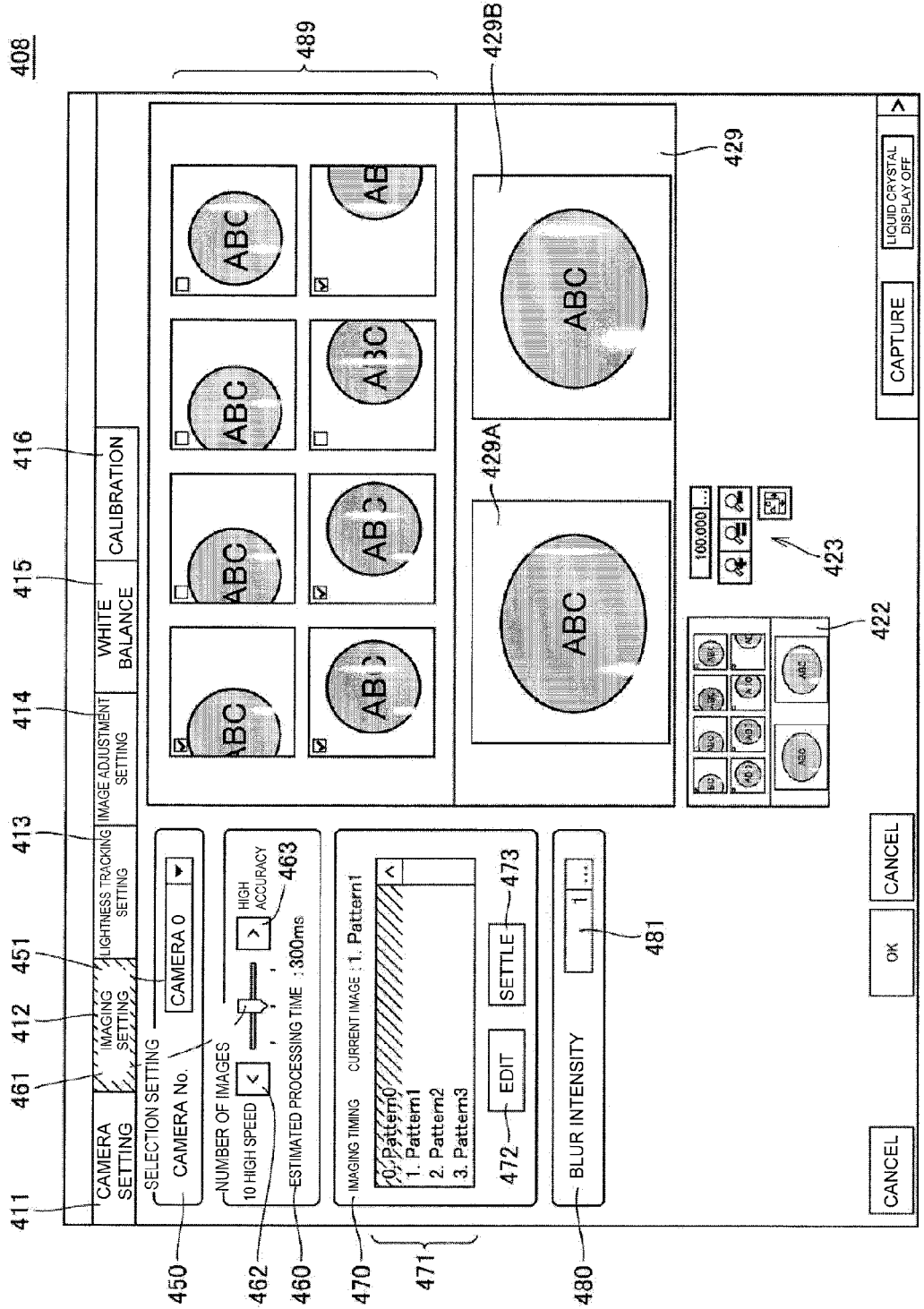
FIG. 15 is a view illustrating still another example of the setting screen that is displayed when the imaging setting tab is selected.

FIG. 15 illustrates still another example of the setting screen that is displayed when the imaging setting tab 412 is selected in accordance with one or more embodiments of the invention. Referring to FIG. 15, in a setting screen 408, an imaging timing setting 470 is used instead of the composition setting 490 in the setting screen 406 illustrated in FIG. 13. The setting screen 408 includes the image display area 429, and a list 489 of the images obtained by imaging the workpiece is displayed in the image display area 429. A composite image 429B that is obtained by performing the error correction based on the blur intensity set in the blur intensity setting 480 and a composite image 429A in which the error correction is not performed are displayed side by side in the image display area 429. Because other configurations are similar to those of FIG. 13, the overlapping description is omitted.

The series of images that are obtained by imaging the workpiece with the imaging unit 8 in the minimum imaging period is displayed in time series in the list 489 of the image display area 429. A checkbox is also displayed in the list 489 while correlated with each image. The user can select the image that should be used in the gloss removal composition by checking the correlated checkbox.

Possibly it is necessary that the selection pattern of the image that should be used be changed depending on the kind of the workpiece or the lighting environment. Therefore, plural selection patterns of the image used in the gloss removal composition can be set in the imaging timing setting 470. That is, the imaging timing setting 470 includes a dialog 471 that is used to produce and edit the plural selection patterns. In the example illustrated in FIG. 15, four selection patterns (pattern 0 to pattern 3) are registered in the dialog 471.

The imaging timing setting 470 includes an edit button 472. Contents of the selection pattern designated in the dialog 471 can be edited when the user selects the edit button 472. After the edit, the contents of the post-change selection pattern is confirmed by selecting a confirm button 473.

Basically, in order to enhance searching accuracy, using the whole of the series of images obtained by imaging one workpiece, the pattern search is performed independently of the selection of the image used. The composite image is produced based on the image information possessed by the image that is selected in the aligned images.

That is, the image processing apparatus 100 displays the plural images acquired by the series of imagings that are performed to the workpiece 2 with the imaging unit 8 in the test run (setting mode), and the image processing apparatus 100 receives the selection of the image used to produce the composite image in the displayed plural images (setting screen 408). In the plural images acquired by the series of imagings that are performed to the conveyed workpiece 2 with the imaging unit 8 in the normal mode, the image processing apparatus 100 produces the composite image using the predetermined number of images according to the imaging timing corresponding to the selection acquired in the test run.

[e4. Automation of Imaging Setting]

In the above-described examples, the user manually performs the imaging setting. Alternatively, the processing of determining automatically the imaging setting may be performed, or the imaging setting of the user may be assisted by computing a recommended value.

Specifically, the number of images and/or the imaging period may be computed based on a permissible processing time per one workpiece not to exceed the processing time. Alternatively, the number of images and/or the imaging period may be computed based on the moving speed of the workpiece.

The image used in the gloss removal composition may be selected based on the change in luminance among the series of images acquired in the test run. That is, which position the region (portion regarded as reflecting the gloss) having the high luminance is generated is determined in each image to select the image in which the positions of the regions having the high luminances are separated from each other. However, even in such cases, preferably the number of images used in the gloss removal composition is determined based on the permissible processing time per one workpiece.

<F. Processing Procedure (Setting Mode)>

A processing procedure in the setting mode will be described below with reference to FIG. 16 in accordance with one or more embodiments of the invention.

Figure 16:
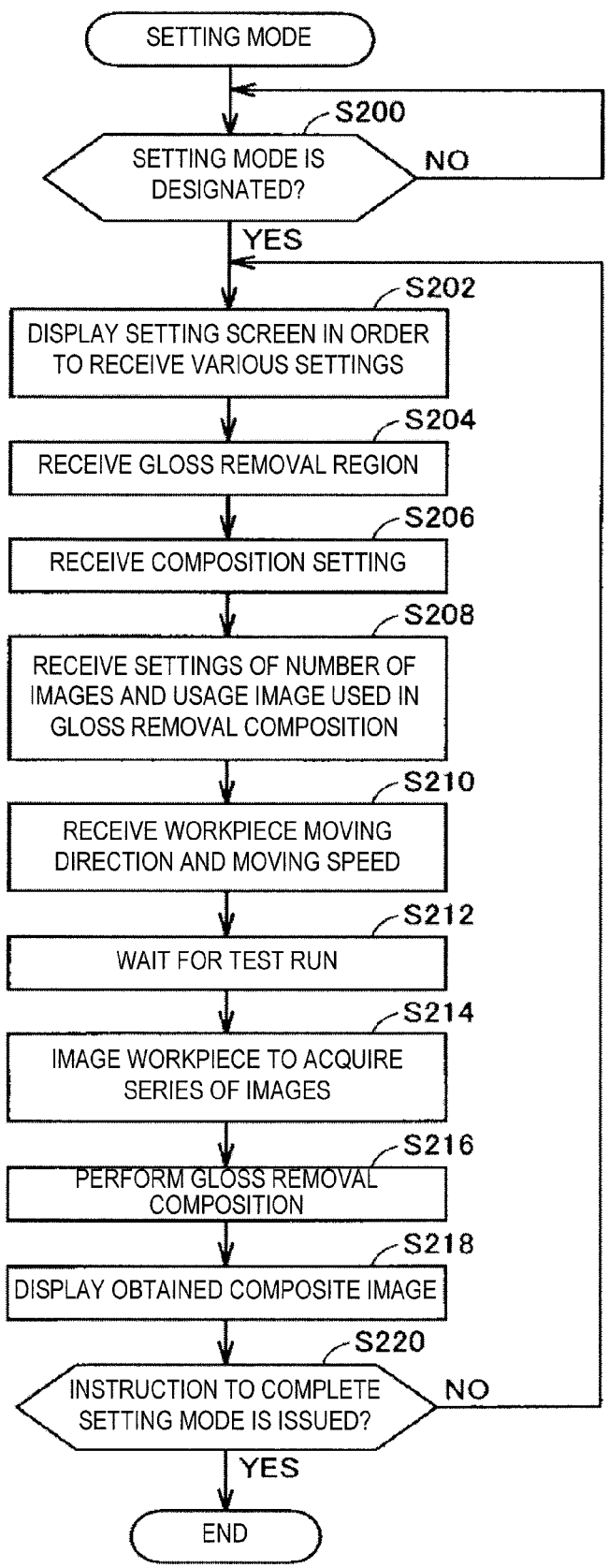
FIG. 16 is a flowchart illustrating a processing procedure in a setting mode in the image processing apparatus of one or more embodiments of the invention.

FIG. 16 is a flowchart illustrating the processing procedure in the setting mode in the image processing apparatus 100 in accordance with one or more embodiments of the invention. It is assumed that the user performs various settings in order to perform the gloss removal composition using the image processing apparatus 100 of one or more embodiments of the invention. That is, the user designates the setting mode.

The CPU 110 determines whether the setting mode is designated (Step S200). When the setting mode is designated (YES in Step S200), the flow goes to Step S202. When the setting mode is not designated (NO in Step S200), the processing in Step S200 is repeatedly performed.

In Step S202, the CPU 110 displays the setting screen in order to receive various settings. That is, the setting screen 402 illustrated in FIG. 6, the setting screen 404 illustrated in FIG. 11, the setting screen 406 illustrated in FIG. 13, the setting screen 407 illustrated in FIG. 14, and the setting screen 408 illustrated in FIG. 15 are displayed in response to the user's manipulation. In the following steps, the CPU 110 receives various settings.

Specifically, in Step S204, the CPU 110 receives a gloss removal region. The gloss removal region means a range on which the user should focus in the measurement processing. In the above-described examples, the gloss removal region corresponds to the range where the characters "ABC" are printed in the surface of the workpiece 2. Typically the user designates the target range in the image display area 421 (FIG. 6) of the setting screen 402 using the user interface screen (not illustrated).

In Step S206, the CPU 110 receives the composition setting. More specifically, the algorithm corresponding to the radio button selected in the composition setting 430 and/or the mode setting 440 on the setting screen 402 illustrated in FIG. 6 is received as the setting value. When the user selects the automatic setting described with reference to FIG. 11, the CPU 110 produces the plural composite image by performing the gloss removal composition to the image obtained by the test run according to the plural algorithms, the CPU 110 evaluates the composite images, and the CPU 110 determines the algorithm in which the optimum composite image can be produced as the setting value.

In Step S208, the CPU 110 receives the settings of the number of images used in the gloss removal composition and the usage image. More specifically, the number of images designated on the setting screen 406 illustrated in FIG. 13 or the setting screen 407 illustrated in FIG. 14 and the usage image designated on the setting screen 408 illustrated in FIG. 15 are received as the setting values.

In Step S210, the CPU 110 receives the moving direction and moving speed of the workpiece 2 in the visual field of the imaging unit 8. As described in the pattern search processing, because the moving amount (vector amount) of the workpiece (subject) is computed from the continuously-imaged images, it is not always necessary to previously set the moving direction and moving speed of the workpiece 2.

When the necessary settings are received by the pieces of processing in Step S204 to S210, the CPU 110 waits for the start of the test run (Step S212). The user puts the image processing apparatus 100 in the operating environment similar to that of the normal running mode, and the user images target workpiece of the measurement processing on a trial basis (test run). When the test run is started, the CPU 110 images the workpiece 2 to acquire the series of images according to the input various settings (Step S214), and the CPU 110 performs the gloss removal composition to the series of images (Step S216). The CPU 110 displays the composite image obtained by the gloss removal composition on the display 102 (Step S218).

In Step S220, the CPU 110 determines whether an instruction to complete the setting mode is issued. That is, the user determines whether the previously-input various settings needs to be reviewed, that is, whether the current setting values have no problem based on the composite image obtained by the test run.

When the instruction to complete the setting mode is issued (YES in Step S220), the CPU 110 stores the input setting values to end the setting mode. When the instruction to complete the setting mode is not issued (NO in Step S220), the CPU 110 stores the input setting values to repeat the pieces of processing from Step S202.

<G. Processing Example>

FIG. 17 is a view illustrating a processing example in which the gloss removal composition in accordance with one or more embodiments of the invention is used. In the processing example illustrated in FIG. 17, a plastic bottle is used as the workpiece 2. FIG. 17A to FIG. 17G illustrate images that are obtained by imaging the workpiece 2 while the workpiece 2 is sequentially moved. FIG. 17H illustrates a composite image that is obtained by the gloss removal composition using the images illustrated in FIG. 17A to FIG. 17G.

As is clear from FIG. 17A to FIG. 17G, in the acquired image, the relative position of the reflected gloss to the workpiece 2 varies by moving relatively the workpiece 2 with respect to the imaging unit 8. That is, in the images illustrated in FIG. 17A to FIG. 17D, part of a barcode printed in the surface of the plastic bottle cannot be recognized because of the reflected gloss. On the other hand, in the images illustrated in FIG. 17E to FIG. 17G, part of contents on the left side of the plastic bottle cannot be recognized because of the gloss while the barcode can be recognized.

Figure 17A:
FIGS. 17A-17H are views illustrating a processing example in which the gloss removal composition of one or more embodiments of the invention is used.
Figure 17B:
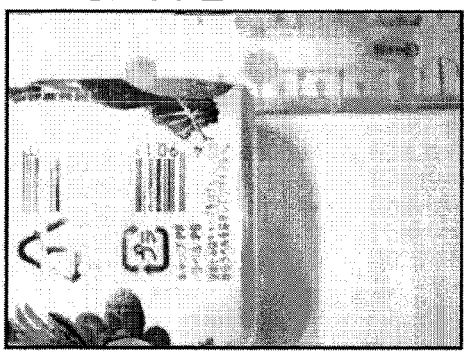
Figure 17C:
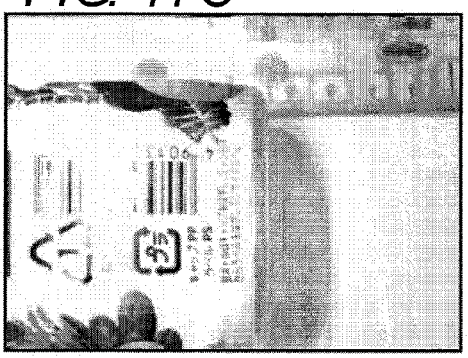
Figure 17D:
Figure 17E:
Figure 17F:
Figure 17G:
Figure 17H:
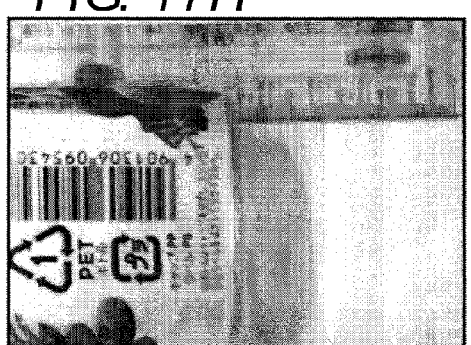

The gloss removal composition of the embodiment is applied to the series of images (FIG. 17A to FIG. 17G) to produce the composite image in which contents printed in the surface of the workpiece 2 can be recognized more correctly (see FIG. 17H).

<H. Gloss Removal Composition in which Visual Field can be Expanded>

In FIG. 4, basically the composite image having the range narrower than the visual field range of the imaging unit 8 is produced by the gloss removal composition. However, the composite image having the range broader than the visual field range of the imaging unit 8 can be produced. An example of processing of producing the composite image having the range broader than the visual field range of the imaging unit 8 will be described below.

[h1. Gloss Removal Composition (First Modification)]

FIG. 18 is a view for explaining pattern search and image alignment processing according to a first modification in accordance with one or more embodiments of the invention. FIG. 18A to FIG. 18F illustrate a series of images that are obtained by imaging continuously a moving workpiece having an ellipsoidal surface shape. FIG. 18G illustrates the composite image SIMG that is obtained by the gloss removal composition based on images IMG1 to IMG6 illustrated in FIG. 18A to FIG. 18F. Contents illustrated in FIG. 18 correspond to another mode of the pieces of processing in Step S106 to S118 illustrated in the flowchart of FIG. 5.

The CPU 110 recognizes execution timing of the gloss removal composition based on the workpiece position detected by the sensor 4 (FIG. 1) and the change of the background in the image acquired with the imaging unit 8. The CPU 110 acquires the image of the workpiece 2 imaged with the imaging unit 8. For example, it is assumed that the CPU 110 acquires the image IMG1 illustrated in FIG. 18A. The CPU 110 sets a model region 231 to the image IMG1 acquired first.

Figure 18A:
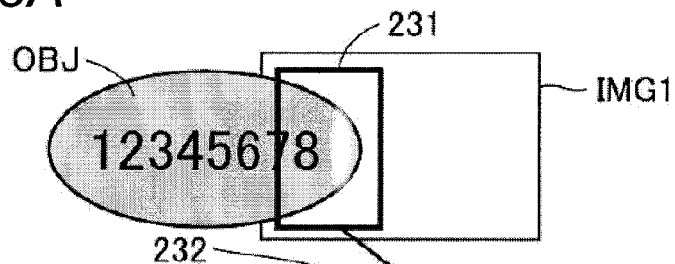
FIGS. 18A-18G are views for explaining pattern search and image alignment processing according to a first modification of one or more embodiments of the invention.
Figure 18B:
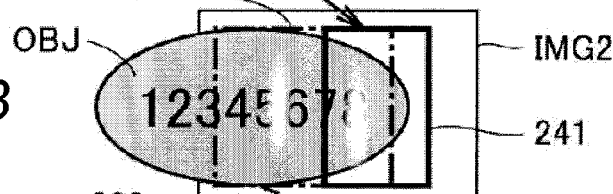
Figure 18C:
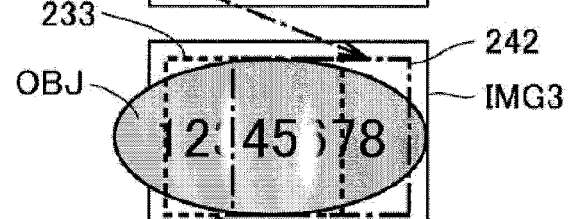
Figure 18D:
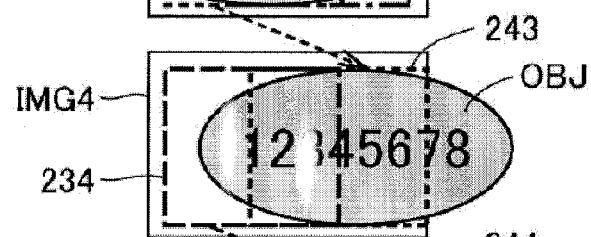

It is assumed that the CPU 110 acquires the image IMG2 illustrated in FIG. 18B after a predetermined time elapses since the first imaging. In the example illustrated in FIG. 18, it is assumed that the workpiece moves from the left toward the right. Therefore, a subject OBJ in which the workpiece 2 is imaged in the image IMG2 acquired second is located on the right of the subject OBJ in the image IMG1 illustrated in FIG. 18A.

The CPU 110 performs the pattern search to the second image IMG2 based on the first model image designated in the model region 231 of the first image IMG1 obtained last. It is assumed that a region 241 of the image IMG2 is matched with the first model image as a result of the pattern search.

At this point, a relative position deviation amount between the model region 231 of the first image IMG1 and the region 241 of the second image IMG2 is computed as the moving amount of the workpiece.

Then the CPU 110 sets a model region 232 to the second image IMG2. At this point, in order to enhance the accuracy of the pattern search, the model region 232 set to the second image IMG2 may be broader than the model region 231 set to the first image IMG1.

More specifically, the moving direction and moving speed of the workpiece that is of the subject OBJ are estimated based on the moving amount (vector amount) between the first image IMG1 and the second image IMG2, and the broader model region 232 is set according to the estimated moving amount. In the example illustrated in FIG. 18B, because the workpiece moves from the left toward the right, a start point of the model region 232 set to the second image IMG2 is set to the left end of the image IMG2 as much as possible, and the model region 232 is expanded toward the right side as much as possible. An expanded width of the model region 232 illustrated in FIG. 18B is widely set as much as possible under the condition that contents set as the model region 232 are included in the visual field of the image (in this example, image IMG3) acquired in the subsequent imaging timing. That is, the model region 232 is set such that at least the moving amount of the workpiece moving between the consecutive two-time imagings can be secured as a margin. When the moving direction and moving speed of the workpiece are well known, a previously-computed range may be set to the model region.

The CPU 110 performs the pattern search to the third image IMG3 based on the second model image that is designated in the model region 232 of the second image IMG2 acquired last. It is assumed that a region 242 of the image IMG3 is matched with the second model image as a result of the pattern search (see FIG. 18C). Similarly, the pieces of processing are performed in the order of (1) a setting of a model region 233 with respect to the third image IMG3 (see FIG. 18C), (2) the pattern search performed to the fourth image IMG4 based on the third model image designated in the model region 233 of the third image IMG3, (3) a setting of a model region 234 with respect to the fourth image IMG4 (see FIG. 18D), (4) the pattern search performed to the fifth image IMG5 based on the fourth model image designated in the model region 234 of the fourth image IMG4 (see FIG. 18E), (5) a setting of a model region 235 with respect to the fifth image IMG4 (see FIG. 18E), and (6) the pattern search performed to the sixth image IMG6 based on the fifth model image designated in the model region 235 of the fifth image IMG5 (see FIG. 18F).

Figure 18E:
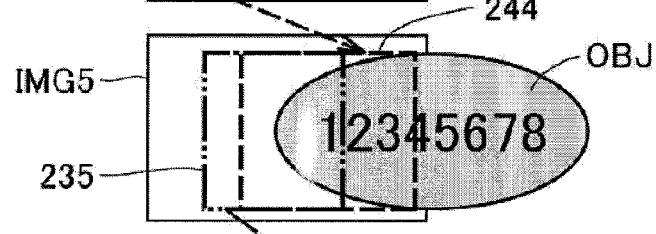
Figure 18F:
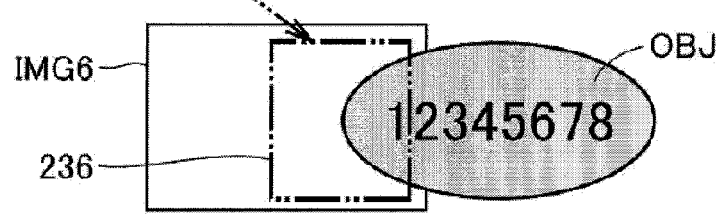

When the workpiece is estimated to run out of the visual field of the imaging unit 8 in the next imaging, the size of the model region is reviewed based on the moving direction and moving speed of the workpiece. For example, as illustrated in FIG. 18E, the model region 235 is set to the fifth image IMG5 in a range narrower than that of the model region 234 set to the fourth image IMG4.

Finally, the alignment of the series of images is performed based on the moving amount between the images obtained by each pattern search. The composite image SIMG illustrated in FIG. 18G is produced by performing the gloss removal composition.

The pattern search (alignment between the images) is performed to all the images including a part or a whole of the workpiece 2 in the images acquired with the imaging unit 8. That is, the images acquired in a period until the workpiece 2 runs out of the visual field of the imaging unit 8 since the workpiece 2 enters the visual field become the target of the alignment.

Figure 18G:
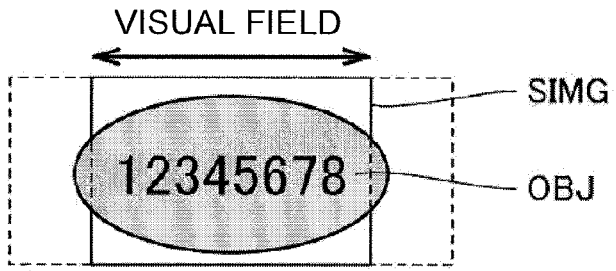

As illustrated in FIG. 18G, according to the gloss removal composition of the first modification of the embodiment, the gloss can efficiently be removed in the image that is broader than the visual field of the imaging unit 8. That is, compared with the range acquired by the one-time imaging with the imaging unit 8, the plural pixels are overlapped plural times in the broader range, which allow the gloss to be removed even if the gloss is reflected on one of the images.

The composite image SIMG produced by the method of the first modification becomes broader than the visual field range (the size of the images IMG1 to IMG6) of the imaging unit 8.

[h2. Gloss Removal Composition (Second Modification)]

In accordance with one or more embodiments of the invention, in the gloss removal composition of the first modification, in order to enhance the searching accuracy, the size of the model region is dynamically determined such that the image expressing the workpiece 2 included in the model region emerges in the image obtained by the subsequent imaging. On the other hand, the model region may fixedly be set to the broader range, when the pattern search can be performed even if part of the model region runs out of the visual field of the imaging unit 8.

FIG. 19 is a view for explaining pattern search and image alignment processing according to a second modification in accordance with one or more embodiments of the invention. FIG. 19A to FIG. 19F illustrate a series of images that are obtained by imaging continuously a moving workpiece having an ellipsoidal surface shape. FIG. 19G illustrates the composite image SIMG that is obtained by the gloss removal composition based on images IMG1 to IMG6 illustrated in FIG. 19A to FIG. 19F.

Figure 19A:
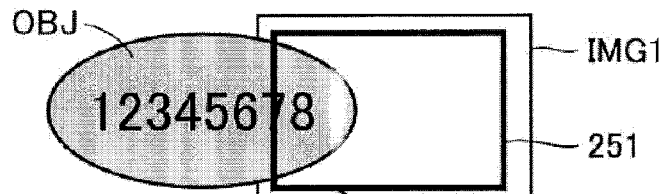
FIGS. 19A-19G are views for explaining pattern search and image alignment processing according to a second modification of one or more embodiments of the invention.
Figure 19B:
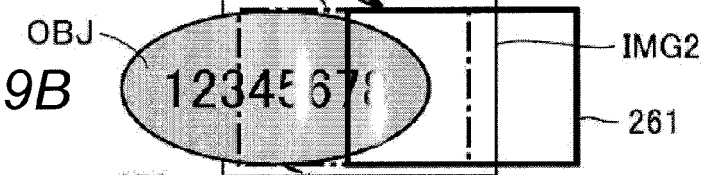
Figure 19C:
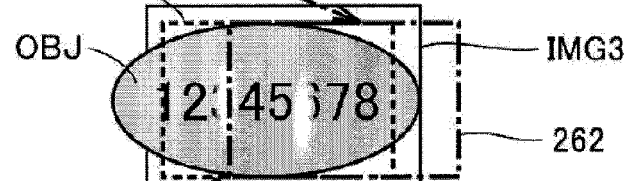
Figure 19D:
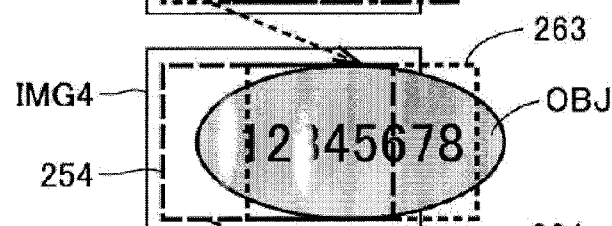
Figure 19E:
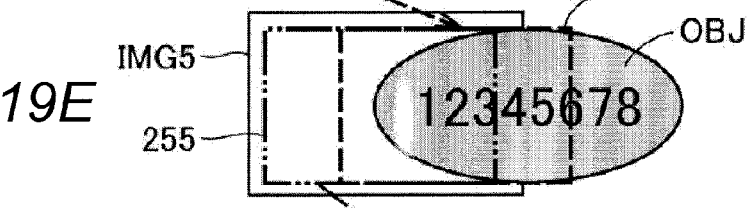
Figure 19F:
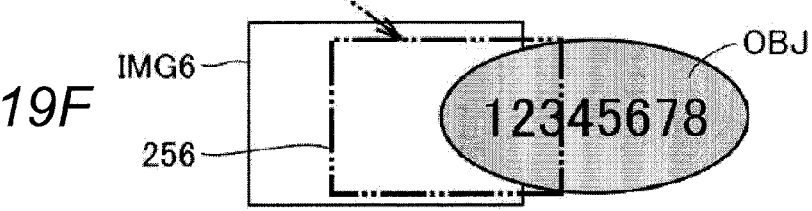

In the second modification, when the execution timing of the gloss removal composition is recognized, the CPU 110 sets a model region 251 to the acquired image IMG1 so as to cover the broader range as illustrated in FIG. 19A. Then the CPU 110 performs the pattern search to the second image IMG2 based on the model image included in the model region 251.

As described above, because the workpiece that is of the subject OBJ moves, part of the corresponding region becomes out of the range of the image IMG2 when the pattern search is performed to the second image IMG2 based on the first model image designated in the model region 251. At this point, for example, the model region is divided into plural small regions, a comprehensive degree of coincidence is computed based on the degrees of coincidence of the small regions, and the computed comprehensive degree of coincidence is evaluated according to a predetermined algorithm, which allows the matched region to be specified. For example, the well-known technology is disclosed in Japanese Unexamined Patent Publication No. 2008-152555.

When the region matched with the first model image is specified in the second image IMG2, as described above, the relative position deviation amount between the model region 251 of the first image IMG1 and a region 261 of the second image IMG2 is computed as the moving amount of the workpiece.

Similarly, the pattern search is performed to the second to sixth images IMG2 to IMG6 while model regions 252 to 256 are set to the second to sixth images IMG2 to IMG6 (see FIG. 19B to FIG. 19F). As a result, the moving amounts are computed among the second to fifth images IMG2 to IMG5.

Figure 19G:
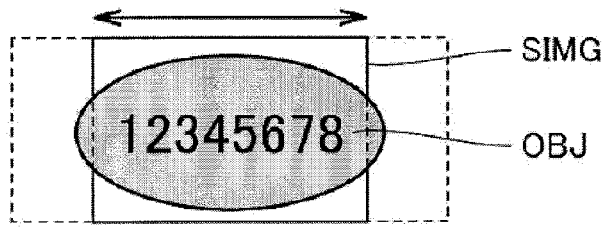

Finally the alignment of the series of images is performed based on the moving amount between the images obtained by the pattern search. The composite image SIMG illustrated in FIG. 19G is produced by performing the gloss removal composition.

[h3. Action and Effect of Gloss Removal Composition in which Visual Field can be Expanded (First and Second Modifications)]

The action and effect in applying the gloss removal composition in which the visual field can be expanded in accordance with one or more embodiments of the invention will be described.

Figure 20:
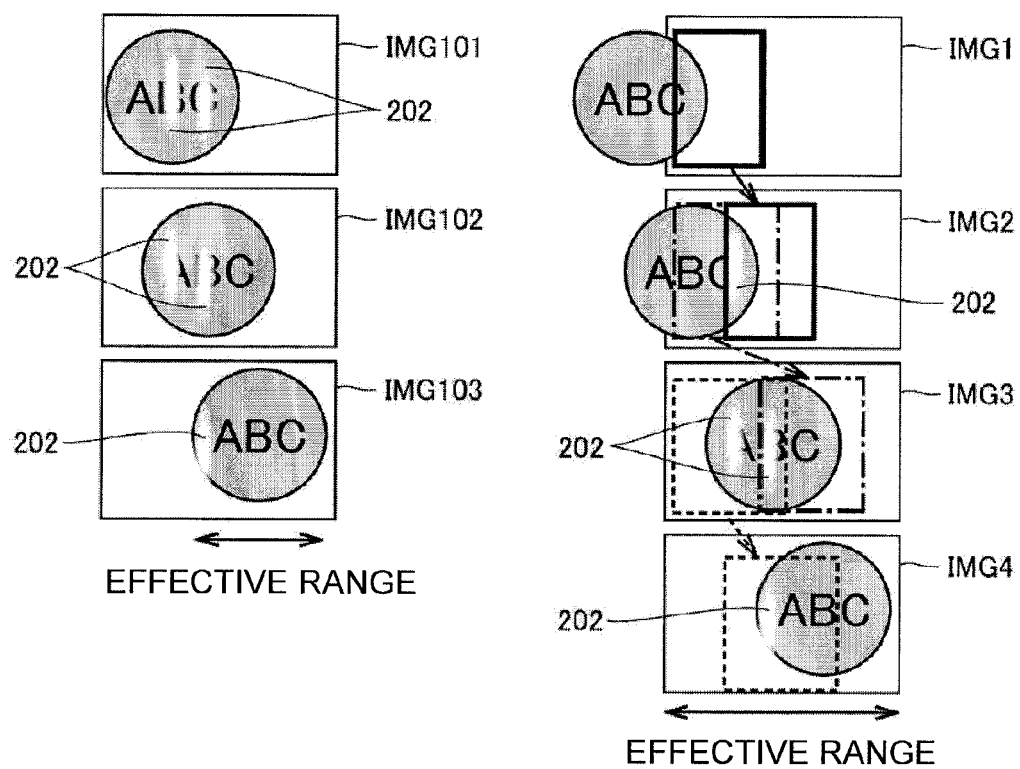
FIG. 20 is a schematic diagram for explaining the action and effect of the gloss removal composition of the modifications of one or more embodiments of the invention.

FIG. 20 is a schematic diagram for explaining the action and effect of the gloss removal composition of the modifications of one or more embodiments of the invention. FIG. 20A illustrates an example in which the plural images are acquired by the method of the embodiment, and FIG. 20B illustrates an example in which the plural images are acquired by the method of the modifications.

As illustrated in FIG. 20A, even if the relative position of the workpiece 2 with respect to the imaging unit 8 varies, the gloss 202 is reflected on the specific region in the visual field of the imaging unit 8. Therefore, there is a restriction to the range that can actually be applied to the gloss removal processing in the image, which is acquired with the imaging unit and corresponds to the visual field. For example, as illustrated in FIG. 20A, in the character "C" of the characters "ABC" of the detection target printed in the workpiece surface, only a movable range becomes the effective range when the whole workpiece falls within the image. Therefore, the gloss cannot be removed in the whole visual field of the imaging unit.

On the other hand, according to the gloss removal composition of the modifications, the gloss can be removed in the whole visual field of the imaging unit 8 as illustrated in FIG. 20B. Therefore, a probability that the reflected gloss 202 is removed can be enhanced to obtain the higher removal effect of the reflected gloss 202.

<I. Installation of Lighting Source>

The visual sensor system 1 of the embodiment includes the lighting source 9 in order to irradiate the workpiece 2 with the light. At this point, sometimes the gloss that cannot be removed by the gloss removal composition is reflected depending on the shape (irradiation pattern) of the lighting source 9. Therefore, preferably the lighting source 9 is installed in a proper positional relationship with the imaging unit 8. The lighting source installing method will be described below taking a rod-shaped lighting source as an example.

FIG. 21 is a schematic diagram illustrating the case where a longitudinal direction of the lighting source 9 is matched with the moving direction of a workpiece 2. In accordance with one or more embodiments of the invention, FIG. 22 is a schematic diagram illustrating the case where the longitudinal direction of the lighting source 9 is orthogonal to the moving direction of the workpiece 2.

As illustrated in FIG. 21, when the longitudinal direction of the lighting source 9 is matched with the moving direction of the workpiece 2, it is found that the ranges where the gloss 202 is reflected are overlapped in a horizontal direction even if the images IMG1, IMG2, and IMG3 obtained by imaging sequentially the workpiece 2 are aligned. Therefore, even if the gloss removal composition is performed based on the images IMG1, IMG2, and IMG3, the gloss 204 that cannot be removed remains in the resultant composite image SIMG.

Figure 22:
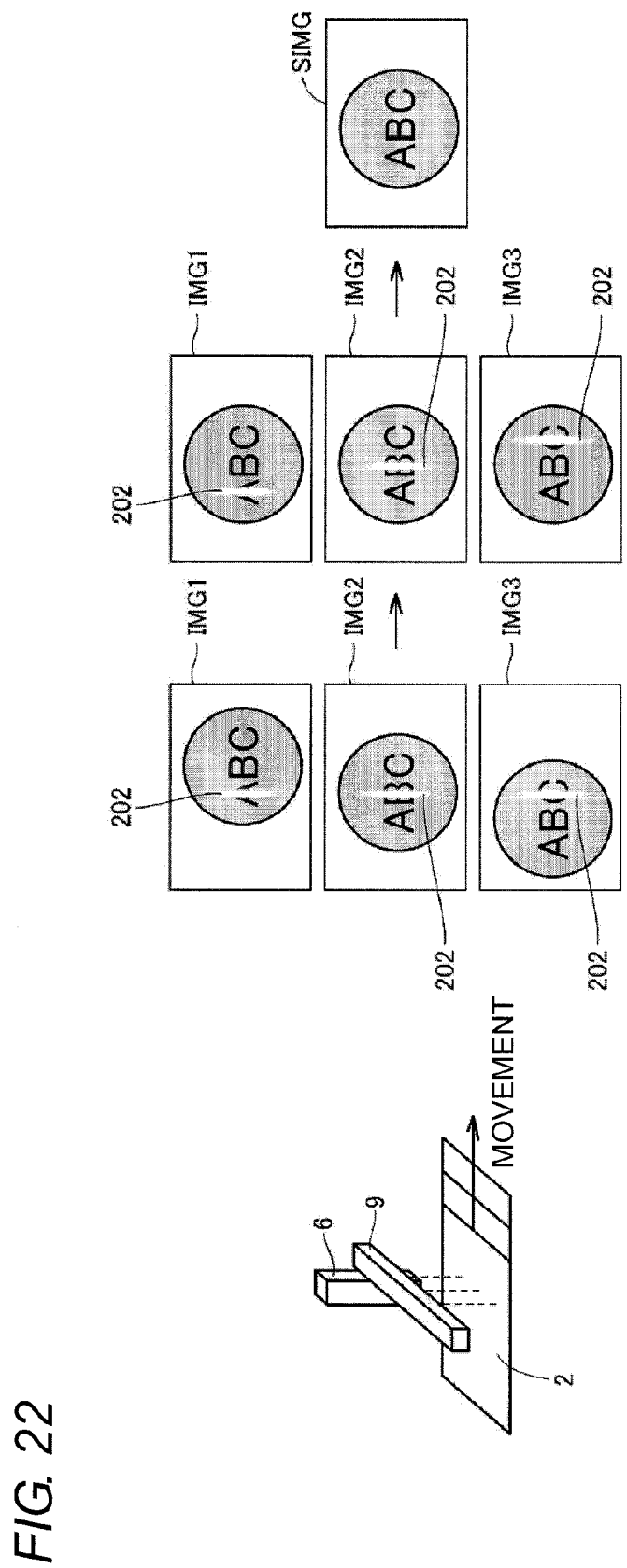
FIG. 22 is a schematic diagram illustrating the case where the longitudinal direction of the lighting source is orthogonal to the moving direction of the workpiece.

On the other hand, as illustrated in FIG. 22, when the longitudinal direction of the lighting source 9 is substantially orthogonal to the moving direction of the workpiece 2, it is found that a width in the horizontal direction of the gloss 202 reflected on the images IMG1, IMG2, and IMG3 obtained by imaging sequentially the workpiece 2 is relatively narrow. Therefore, the position in which the gloss 202 is generated can be varied among the images IMG1, IMG2, and IMG3 by aligning the images. As a result, the composite image SIMG in which the gloss 202 is removed can be produced by performing the gloss removal composition based on the images IMG1, IMG2, and IMG3.

<J. Action and Effect>

According to one or more embodiments of the invention, basically the imaging is performed plural times to the moving workpiece 2 while the imaging condition of the imaging unit 8 and the lighting condition of the lighting source 9 are maintained. That is, because the relative position of the workpiece 2 with respect to the imaging unit 8 moves temporally, it is believed that the region where the gloss is reflected on the workpiece 2 varies among the images. Therefore, even in the image information that cannot correctly be acquired in a certain image, the probability of being able to acquire correctly the image information in another image is increased. The influence of the reflected gloss is removed by producing the composite image using the series of acquired images.

According to one or more embodiments of the invention, the target composite image can be produced without influencing the conveyance of the workpiece 2. The workpiece 2 moves in a predetermined direction while being placed on the belt conveyer. That is, the reflected gloss can be removed without immobilizing the moving inspection object, and the measurement processing can accurately be performed to the workpiece.

While the invention has been described with respect to a limited number of embodiments, those skilled in the art, having benefit of this disclosure, will appreciate that other embodiments can be devised which do not depart from the scope of the invention as disclosed herein. The scope of the invention is not indicated by the description but the claims, and the meaning equivalent to the claims and all the changes within the claims are included in the invention.

What is claimed is:

1. An image processing method comprising the steps of:
   imaging an inspection object moving in a predetermined direction a plurality of times with an imaging unit disposed in a predetermined position while a visual field of the imaging unit is lighted by a lighting source disposed in a constant relative position with respect to the imaging unit;
   aligning a plurality of images with the inspection object as a reference by searching sequentially for a region indicating at least part of the inspection object between two images in the plurality of images of the moving inspection object acquired by a series of imagings with the imaging unit; and
   producing a composite image from the plurality of aligned images,
      wherein the producing the composite image comprises a step of computing image information representing a unit region from pieces of image information possessed by regions in the plurality of aligned images,
      wherein the step of computing is performed to compute image information corresponding to each unit region constituting the composite image.

2. The image processing method according to claim 1, wherein the step of computing image information further comprises:
   acquiring a luminance of the image information possessed by the region of each of the plurality of aligned images and
   computing one of a minimum value, a maximum value, an average value, and a median of the image information representing the unit region with respect to the acquired luminance.

3. The image processing method according to claim 1, wherein the step of producing the composite image further comprises the steps of:
   providing a plurality of different computation rules to compute the image information representing the unit region and producing a plurality of kinds of composite images according to each of the plurality of different computation rules;
   displaying the plurality of kinds of composite images; and
   receiving selection from the plurality of different computation rules that should be used to produce the composite image in the plurality of computation rules.

4. The image processing method according to claim 1, wherein the step of producing the composite image further comprises the steps of:
   providing a plurality of different computation rules to compute the image information representing the unit region and producing a plurality of kinds of composite images according to each of the plurality of different computation rules;

computing an index indicating a discrimination degree with respect to the plurality of kinds of composite images; and selecting a computation rule that should be used to produce the composite image in the plurality of computation rules according to the computed index.

5. The image processing method according to claim 1, wherein the aligning step further comprises the steps of:

extracting a first region indicating the inspection object from a first image that is acquired by imaging the inspection object and searching a region that is matched with the first region in a second image that is acquired subsequent to the first image; and extracting a second region having a size independently of a size of the first region from the second image, the second region indicating the inspection object, and searching a region that is matched with the second region in a third image that is acquired subsequent to the second image.

6. The image processing method according to claim 1, wherein all the images including a whole or part of the inspection object in the images that are acquired with the imaging unit are aligned in the aligning step.

7. The image processing method according to claim 1, wherein a composite image having a range broader than a visual field range of the imaging unit is produced in the composite image producing step.

8. The image processing method according to claim 1, wherein the lighting source is disposed such that a longitudinal direction of the lighting source is substantially orthogonal to a moving direction of the inspection object.

9. The image processing method according to claim 1, wherein the step of producing the composite image further includes the steps of:

displaying the plurality of images that are acquired by performing a series of imagings to a first inspection object with the imaging unit;

receiving selection of the image that is used to produce the composite image in the plurality of displayed images;

producing the composite image using the image corresponding to imaging timing of an image selected with respect to the first inspection object in a plurality of images that are acquired by performing a series of imagings to a second inspection object with the imaging unit.

10. An image processing system comprising:

an imaging unit that is disposed in a predetermined position;

a lighting source that is disposed in a constant relative position with respect to the imaging unit; and a control unit, wherein the control unit is configured for causing the imaging unit to image an inspection object moving in a predetermined direction a plurality of times while a visual field of the imaging unit is lighted;

aligning a plurality of images with the inspection object as a reference by searching sequentially for a region indicating at least part of the inspection object between two images in the plurality of images of the moving inspection object acquired by a series of imagings with the imaging unit; and producing a composite image by computing image information representing a unit region from pieces of image information possessed by regions in the plurality of aligned images, the computation being performed to compute image information corresponding to each unit region.

11. The image processing method according to claim 2, wherein the step of producing the composite image further comprises the steps of:

providing a plurality of different computation rules to compute the image information representing the unit region and producing a plurality of kinds of composite images according to each of the plurality of different computation rules;

displaying the plurality of kinds of composite images; and receiving selection from the plurality of different computation rules that should be used to produce the composite image in the plurality of computation rules.

12. The image processing method according to claim 2, wherein the step of producing the composite image further comprises the steps of:

providing a plurality of different computation rules to compute the image information representing the unit region and producing a plurality of kinds of composite images according to each of the plurality of different computation rules;

computing an index indicating a discrimination degree with respect to the plurality of kinds of composite images; and selecting a computation rule that should be used to produce the composite image in the plurality of computation rules according to the computed index.

\* \* \* \* \*